(12) United States Patent
Hayashi et al.

(10) Patent No.: US 12,528,430 B2
(45) Date of Patent: Jan. 20, 2026

(54) VEHICLE CONTROL DEVICE AND VEHICLE CONTROL SYSTEM

(71) Applicant: DENSO CORPORATION, Kariya (JP)

(72) Inventors: Ryo Hayashi, Kariya (JP); Satoshi Niwa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/802,145

(22) Filed: Aug. 13, 2024

(65) Prior Publication Data

US 2024/0399983 A1 Dec. 5, 2024

Related U.S. Application Data

(63) Continuation of application No. PCT/JP2023/011274, filed on Mar. 22, 2023.

(30) Foreign Application Priority Data

Mar. 30, 2022 (JP) .................... 2022-057206

(51) Int. Cl.
*G06F 11/30* (2006.01)
*B60R 16/023* (2006.01)

(52) U.S. Cl.
CPC ...... *B60R 16/0232* (2013.01); *G06F 11/3034* (2013.01); *G06F 11/3065* (2013.01)

(58) Field of Classification Search
None
See application file for complete search history.

(56) References Cited

FOREIGN PATENT DOCUMENTS

| CN | 119987708 A | * | 5/2025 |
|---|---|---|---|
| JP | 2006192967 A | | 7/2006 |
| JP | 2021128375 A | | 9/2021 |

* cited by examiner

*Primary Examiner* — K. Wong
(74) *Attorney, Agent, or Firm* — Harness, Dickey & Pierce, P.L.C.

(57) ABSTRACT

A vehicle control system includes a vehicle control device mounted on a vehicle and a service providing unit configured to provide a service related to the vehicle. The vehicle control device includes: a request reception unit configured to receive an operation request for a target equipment device that is an operation target of the equipment device from the service providing unit; a threshold setting unit configured to set a time threshold based on a setting value according to a vehicle characteristic; and a timeout process unit configured to execute a timeout process.

14 Claims, 13 Drawing Sheets

FIG. 12

DATA TABLE OF FIRST SETTING VALUE FOR AIR CONDITIONER CONTROL
DATA TABLE OF SECOND SETTING VALUE FOR LAMP CONTROL
DATA TABLE OF FIRST SETTING VALUE FOR LAMP CONTROL

| EQUIPMENT DEVICE CHARACTERISTIC | | STATE CHARACTERISTIC | | | | | | | |
|---|---|---|---|---|---|---|---|---|---|
| | | POWER STATE | | | | | | | |
| | | COMMUNICATION METHOD | | | | | | | |
| | | +B | | ACC | | | IG | | |
| | | CAN | CAN+LIN | CAN | CAN+LIN | | CAN | CAN+LIN | |
| OEM SUPPLYER | A COMPANY MADE BY X | 100ms | 130ms | 50ms | 80ms | | 30ms | 40ms | |
| | MADE BY Y | 80ms | 110ms | 50ms | 70ms | | 20ms | 30ms | |
| | ... | ... | ... | ... | ... | | ... | ... | |
| B COMPANY | MADE BY Z | 50ms | 80ms | 20ms | 40ms | | 10ms | 20ms | |
| | ... | ... | ... | ... | ... | | ... | ... | |

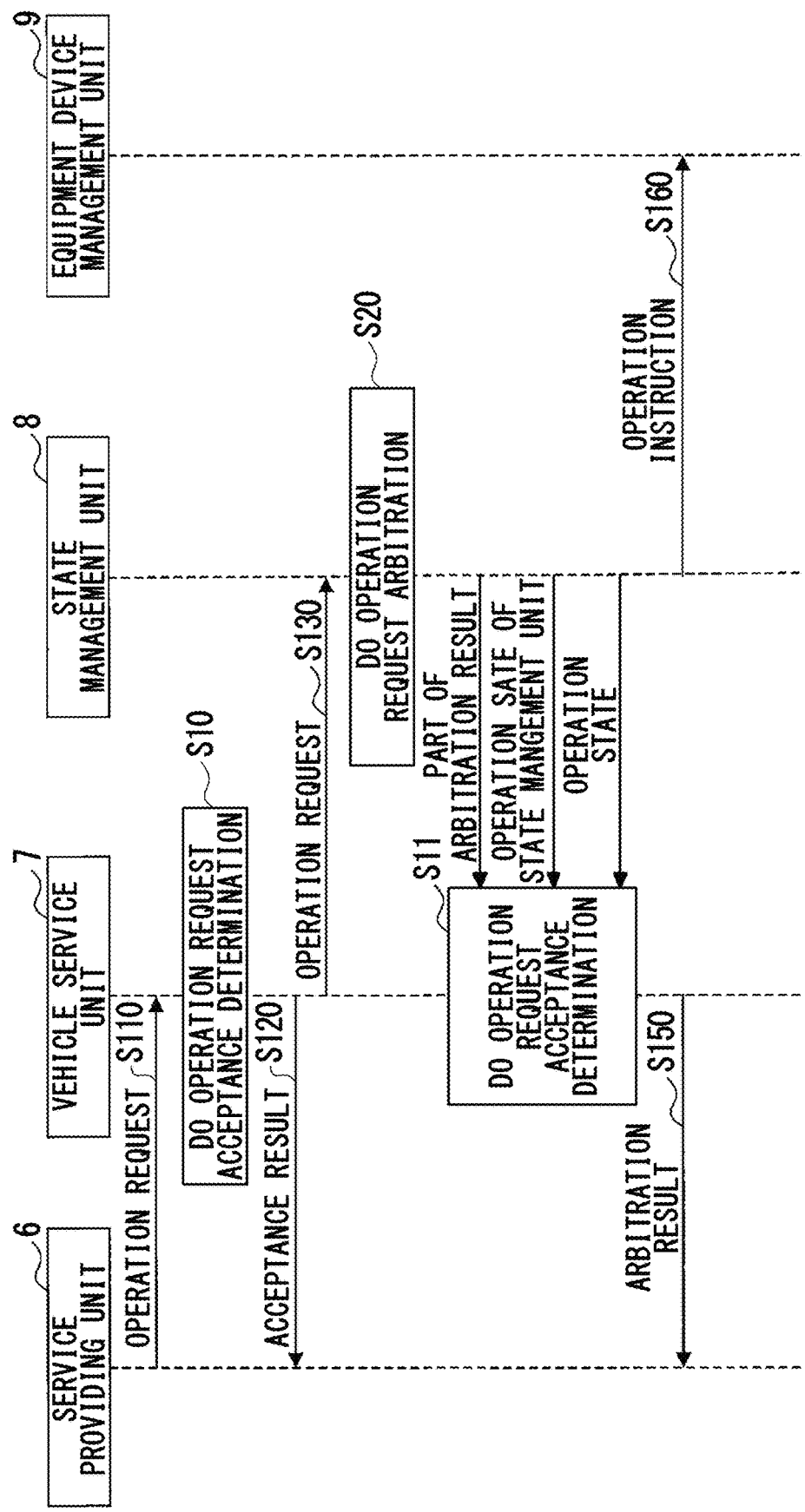

VEHICLE CONTROL DEVICE AND VEHICLE CONTROL SYSTEM

CROSS REFERENCE TO RELATED APPLICATIONS

The present application is a continuation application of International Patent Application No. PCT/JP2023/011274 filed on Mar. 22, 2023, which designated the U.S. and claims the benefit of priority from Japanese Patent Application No. 2022-057206 filed on Mar. 30, 2022. The entire disclosures of all of the above applications are incorporated herein by reference.

TECHNICAL FIELD

The present disclosure relates to a technique for executing a timeout process.

BACKGROUND

A remote control system of a comparative example below includes a center, a master electronic control unit (hereinafter, referred to as ECU), a slave ECU, an in-vehicle device, and a mobile terminal. The master ECU operates the in-vehicle device via the slave ECU in accordance with a remote operation request from a mobile terminal via the center. After transmitting the remote operation request, the center executes a timeout process. Specifically, when there is no response from the master ECU within a predetermined time after the center transmits a remote operation request, the center disconnects the wireless communication connection with the master ECU.

SUMMARY

A vehicle control system includes a vehicle control device mounted on a vehicle and a service providing unit configured to provide a service related to the vehicle. The vehicle control device includes: a request reception unit configured to receive an operation request for a target equipment device that is an operation target of the equipment device from the service providing unit; a threshold setting unit configured to set a time threshold based on a setting value according to a vehicle characteristic; and a timeout process unit configured to execute a timeout process.

BRIEF DESCRIPTION OF THE DRAWINGS

FIG. 12 is an example of a data table stored in a memory of the vehicle control device according to the embodiment.

FIG. 14 is a sequence diagram showing a flow of basic processes executed in the vehicle control system according to another embodiment.

DETAILED DESCRIPTION

Figure 1:
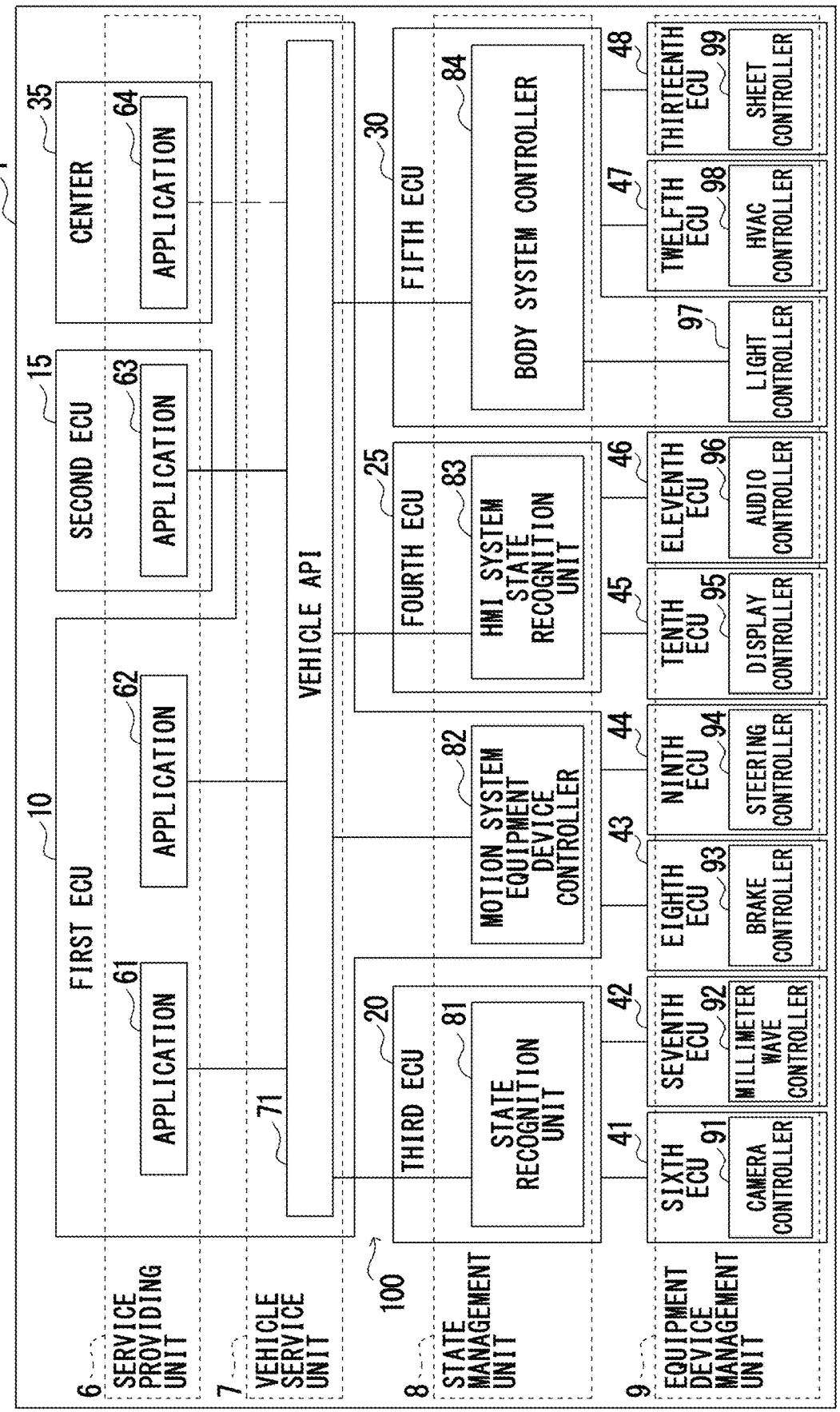
FIG. 1 is a block diagram showing a configuration of a vehicle control system according to an embodiment.

The response time of the master ECU to respond to the center after receiving the remote operation request varies depending on the characteristics of the vehicle, such as the type of vehicle and the supplier of the in-vehicle device. As a result of detailed study by the inventors, it was found that the center is necessary to acquire the characteristics of the vehicle from the master ECU and execute a timeout process taking the characteristics of the vehicle into consideration. Further, since the center must execute a different timeout process for each master ECU, a difficulty has been found in that the versatility of the process executed by the center is reduced.

It is desirable for the present disclosure to implement a timeout process that absorbs differences in response time that depend on vehicle characteristics.

According to one example embodiment, a vehicle control device is mounted on a vehicle and includes a storage, a request reception unit, a threshold setting unit, and a timeout process unit. The storage stores a data table of setting values according to an equipment device characteristic and a state characteristic of a vehicle for each equipment device of the vehicle. The request reception unit receives an operation request for a target equipment device from a service providing unit configured to provide a service for operating the target equipment device that is an operation target of the equipment device. The threshold setting unit sets a time threshold based on a setting value according to the equipment device characteristic of the target equipment device and a current state characteristic of the vehicle of the setting value in the data table of the target equipment device when the request reception unit receives the operation request. The timeout process unit executes a timeout process during execution of a process in response to reception of the operation request by the request reception unit, based on the time threshold set by the threshold setting unit.

The vehicle control device described above sets a time threshold according to the characteristics of the target equipment device and the current vehicle state characteristics, and executes the timeout process based on the set time threshold. That is, the vehicle control device executes the timeout process taking into consideration the difference in response time due to the characteristics of the target equipment device and the current state characteristics of the vehicle. When the vehicle control device stops the process in response to the reception of the operation request, no response is transmitted from the vehicle control device to the service providing unit. Therefore, when the service providing unit does not receive the response from the vehicle control device at a certain cycle, the service providing unit can determine the timeout, and stop the process corresponding to the transmission of the operation request. Accordingly, in the vehicle control device, it is possible to implement the timeout process that absorbs differences in response time due to the vehicle characteristics. Further, the service providing unit can implement the timeout process that is independent of the vehicle characteristics.

According to another example embodiment, a vehicle control system includes a vehicle control device mounted on a vehicle and a service providing unit configured to provide a service related to the vehicle. The vehicle control device includes a storage, a request reception unit, a threshold setting unit, and a timeout process unit. The storage stores a data table of setting values according to an equipment device characteristic or a state characteristic of a vehicle for each equipment device of the vehicle. The request reception unit receives an operation request for a target equipment device that is an operation target of the equipment device from the service providing unit. The threshold setting unit sets a first time threshold based on a setting value according to the equipment device characteristic of the target equipment device or a current state characteristic of the vehicle of the setting value in the data table of the target equipment device when the request reception unit receives the operation request. The first timeout process unit executes a first timeout process during execution of a process in response to reception of the operation request by the request reception unit, based on the first time threshold set by the threshold setting unit. The service providing unit includes an execution unit, a request transmission unit, and a second timeout process unit. The execution unit executes an application for operating the target equipment device. The request transmission unit transmits the operation request to the vehicle control device in response to execution of the application by the execution unit. The second timeout process unit executes a second timeout process during execution of a process in response to transmission of the operation request by the request reception unit, based on the second time threshold that is fixed and independent of the first time threshold.

The vehicle control system provides the similar effects as the vehicle control device.

According to another example embodiment, a vehicle control method is executed by a vehicle control device that is mounted on a vehicle and includes a storage that stores a data table of a setting value according to an equipment characteristic and a state characteristic of the vehicle for each of an equipment device of the vehicle, and the method includes: receiving an operation request for a target equipment device from a service providing unit configured to provide a service for operating the target equipment device that is an operation target of the equipment device; setting a time threshold based on a setting value according to the equipment characteristic of the target equipment device and a current state characteristic of the vehicle of the setting value in the data table of the target equipment device in response to reception of the operation request; and execute a timeout process during execution of a process in response to the reception of the operation request based on the set time threshold.

The vehicle control method provides the similar effects to the vehicle control device.

According to another example embodiment, a vehicle control method is executed by a vehicle control system including: a vehicle control device mounted on a vehicle and storing a data table of a setting value according to an equipment characteristic or a state characteristic of the vehicle for each of an equipment device of the vehicle; and a service providing unit configured to provide a service related to the vehicle. The vehicle control device receives an operation request for a target equipment device from the service providing unit, the target equipment device being an operation target of the equipment device. The vehicle control device sets a first time threshold based on a setting value according to the characteristic of the target equipment device or a current state characteristic of the vehicle of the setting value in the data table of the target equipment device in response to reception of the operation request. The vehicle control device executes a first timeout process during execution of a process in response to the reception of the operation request based on the set first time threshold. The service providing unit executes an application for operating the target equipment device, and transmits the operation request to the vehicle control device in response to execution of the application, and executes a second timeout process during execution of a process in response to transmission of the operation request based on a fixed second time threshold independent of the first time threshold.

The vehicle control method provides the similar effects to the vehicle control device.

According to another example embodiment, a vehicle control program causes a processor of a vehicle control device mounted on a vehicle and including a storage that stores a data table of a setting value according to a state characteristic of the vehicle and an equipment device characteristic for each of an equipment device of the vehicle to: receive an operation request for a target equipment device from a service providing unit configured to provide a service for operating the target equipment device that is an operation target of the equipment device; set a time threshold based on a setting value according to the equipment characteristic of the target equipment device and a current state characteristic of the vehicle of the setting value in the data table of the target equipment device in response to reception of the operation request; and execute a timeout process during execution of a process in response to the reception of the operation request based on the set time threshold.

The vehicle control program is executed by the processing device to provide the similar effects as those of the vehicle control device.

According to another example embodiment, the vehicle control device is mounted on a vehicle and includes a vehicle service unit and a state management unit. The vehicle service unit includes a storage, a first request reception unit, a threshold setting unit, a timeout process unit, and a first notification unit. The storage stores a data table of setting values according to an equipment device characteristic and a state characteristic of a vehicle for each equipment device of the vehicle. The first request reception unit receives an operation request for the target equipment device from the service providing unit. The threshold setting unit sets a time threshold based on a setting value according to the equipment device characteristic of the target equipment device and a current state characteristic of the vehicle of the setting value in the data table of the target equipment device when the first request reception unit receives the operation request. The timeout process unit executes a timeout process during execution of a process in response to reception of the operation request by the first request reception unit, based on the time threshold set by the threshold setting unit. The first notification unit notifies the service providing unit of an operation result according to the operation request for the target equipment device. The state management unit includes a second request reception unit, an operation instruction unit, and a second notification unit. The second request reception unit receives an operation request for the target equipment device from the vehicle service unit. The operation instruction unit instructs the equipment device management unit to perform an operation on the target equipment device. The second notification unit notifies the vehicle service unit of an operation state according to the operation request for the target equipment device.

According to the vehicle control device of the above-described another aspect, the similar effects to those of the vehicle control device of the present disclosure are achieved.

According to another example embodiment, a vehicle control method is executed by a vehicle control device that is mounted on a vehicle and includes a storage that stores a data table of a setting value according to an equipment characteristic and a state characteristic of the vehicle for each of an equipment device of the vehicle. The vehicle control device receives an operation request for a target equipment device from a service providing unit configured to provide a service for operating the target equipment device that is an operation target of the equipment device, sets a time threshold based on a setting value according to the equipment characteristic of the target equipment device and a current state characteristic of the vehicle of the setting value in the data table of the target equipment device in response to reception of the operation request, executes a timeout process during execution of a process in response to the reception of the operation request based on the set time threshold, instructs an equipment device management unit configured to control an equipment device of the vehicle to operate for the target equipment device in response to the operation request, receives an operation state according to the operation request for the target equipment device from the equipment device management unit, and notifies the service providing unit of the operation result according to the operation request for the target equipment device.

According to the vehicle control method described above, the similar effects to those of the vehicle control device of the present disclosure are achieved.

According to another example embodiment, a vehicle control program causes a processor of a vehicle control device mounted on a vehicle and including a storage that stores a data table of a setting value according to a state characteristic of the vehicle and an equipment device characteristic for each of an equipment device of the vehicle to: receive an operation request for a target equipment device from a service providing unit configured to provide a service for operating the target equipment device that is an operation target of the equipment device; set a time threshold based on a setting value according to the equipment characteristic of the target equipment device and a current state characteristic of the vehicle of the setting value in the data table of the target equipment device in response to reception of the operation request; execute a timeout process during execution of a process in response to the reception of the operation request based on the set time threshold; instruct an equipment device management unit configured to control an equipment device of the vehicle to operate for the target equipment device in response to the operation request; receive an operation state according to the operation request for the target equipment device from the equipment device management unit; and notify the service providing unit of the operation result according to the operation request for the target equipment device.

The vehicle control program is executed by the processing device to provide the similar effects as those of the vehicle control device of the aspect of the present disclosure.

1. Configuration (1-1. System Configuration)

A vehicle control system 1 according to the present embodiment will be described with reference to FIG. 1. The vehicle control system 1 includes an electronic control unit (hereinafter, referred to as ECUs) group 100 mounted on a vehicle such as an automobile, and a center 35. The ECU group 100 includes a plurality of ECUs. In the present embodiment, the ECU group 100 includes a first ECU 10, a second ECU 15, a third ECU 20, a fourth ECU 25, a fifth ECU 30, and sixth to thirteenth ECUs 41 to 48. The ECUs 100 are connected to each other via in-vehicle communication (i.e., wired communication or wireless communication). The center 35 is provided outside the vehicle and is connected to the ECU group 100 via vehicle exterior communication (i.e., wireless communication).

Each of the ECU group 100 and the center 35 controls a target equipment device that is a target of the operation request among equipment devices mounted on the vehicle. Here, the equipment device may include hardware such as sensors and actuators, as well as software that implements a certain function.

In another embodiment, the vehicle control system 1 may include the ECU group 100 but may not include the center 35. Further, in another embodiment, the ECU group 100 may include fourteen or more ECUs, or may include only thirteen or fewer ECUs.

(1-2. Hardware Configuration)

Figure 2:
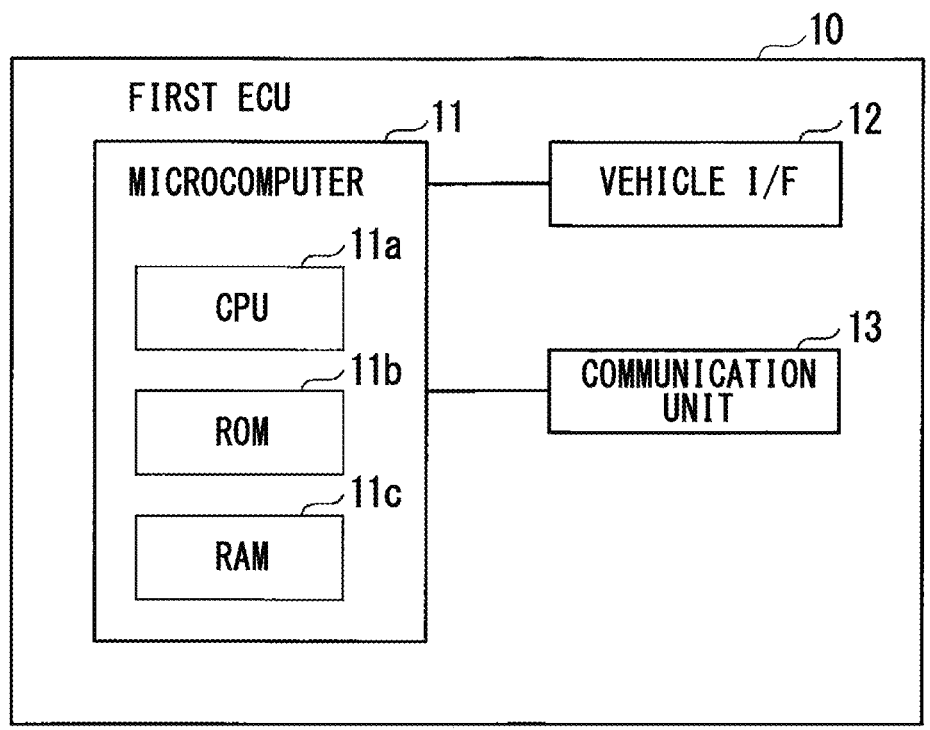
FIG. 2 is a block diagram showing a configuration of an ECU according to the embodiment.
Figure 3:
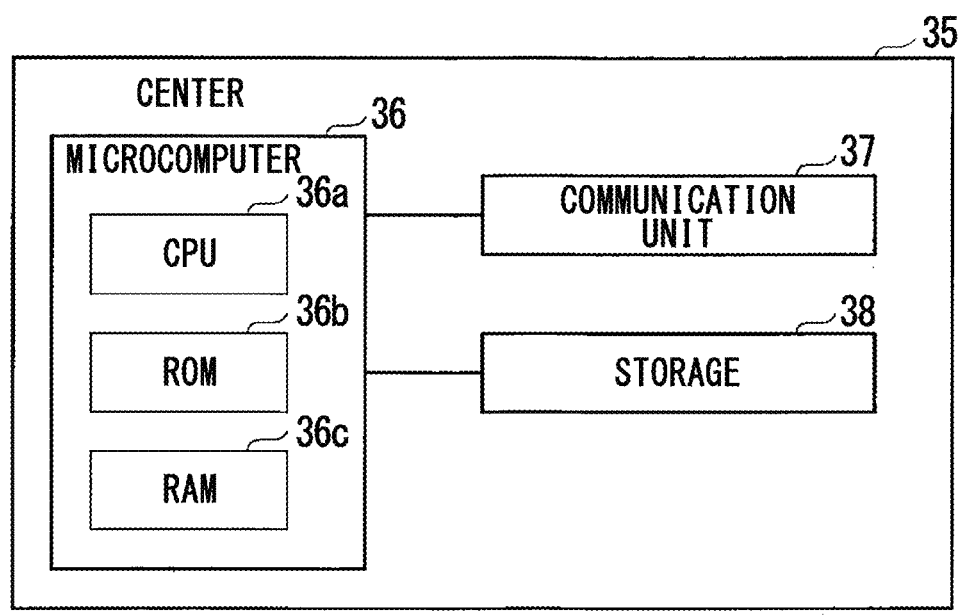
FIG. 3 is a block diagram showing a configuration of a center according to the embodiment.

Next, the hardware configuration of the ECU group 100 and the center 35 will be described with reference to FIG. 2 and FIG. 3.

Each ECU of the ECU 100 has a similar hardware configuration. Accordingly, the configuration of the first ECU 10 will be described here as a representative. The first ECU 10 includes a microcomputer 11, a vehicle interface (hereinafter, I/F) 12, and a communication unit 13. The microcomputer 11 includes a CPU 11*a*, a ROM 11*b*, and a RAM 11*c*. Various functions of the first ECU 10 are implemented by the CPU 11*a* executing a program stored in a non-transitory tangible storage medium. In the present embodiment, the ROM 11*b* corresponds to a non-transitory tangible storage medium storing a program. By executing the program, a method corresponding to the program is executed.

The vehicle I/F 12 is connected to other ECUs and in-vehicle devices via an in-vehicle network or the like, and acquires various information from the other ECUs and in-vehicle devices. The in-vehicle network may include a Controller Area Network (hereinafter, CAN) and Ethernet. The CAN is a registered trademark. The Ethernet is a registered trademark.

The communication unit 13 performs data communication with the center 35 and the like via a wide area communication network by wireless communication. The method for implementing the various functions of the first ECU 10 is not limited to software, and some or all of the elements may be implemented using one or more pieces of hardware. For example, in a case where the above-described functions are realized by an electronic circuit that is hardware, the electronic circuit may be implemented by a digital circuit including a large number of logic circuits, an analog circuit, or a combination thereof.

The center 35 includes a microcomputer 36, a communication unit 37, and a storage 38. The microcomputer 36 includes a CPU 36a, a ROM 36b, and a RAM 36c. The various functions of the center 35 are implemented by the CPU 36a executing a program stored in a non-transitory tangible storage medium. In the present embodiment, the ROM 36b corresponds to a non-transitory tangible storage medium storing a program. By executing the program, a method corresponding to the program is executed.

The communication unit 37 performs data communication with the ECU group 100 via a wide area communication network. The storage 38 is a storage device for storing vehicle data and the like provided by the ECU group 100. The method for implementing the various functions of the center 35 is not limited to software, and some or all of the elements may be implemented using one or more pieces of hardware. For example, in a case where the above-described functions are implemented by an electronic circuit that is hardware, the electronic circuit may be implemented by a digital circuit including a large number of logic circuits, an analog circuit, or a combination thereof.

(1-3. Functional Configuration)

Returning to FIG. 1, various functions of the vehicle control system 1 will be described. The vehicle control system 1 has the functions of an equipment device management unit 9 in the first layer, a state management unit 8 in the second layer, a vehicle service unit 7 in the third layer, and a service providing unit 6 in the fourth layer. The software architecture of the vehicle control system 1 is layered into these four layers. These functions of the vehicle control system 1 are shared between the ECU group 100 and the center 35.

The equipment device management unit 9 includes a plurality of controllers corresponding to the equipment devices of a plurality of types of vehicles. The vehicle equipment devices include, for example, an in-vehicle camera, an in-vehicle millimeter wave radar, brakes, steering, displays, speakers, various lights, in-vehicle air conditioners, electric power seats, and the like.

Specifically, the equipment device management unit 9 includes a camera controller 91, a millimeter wave controller 92, a brake controller 93, a steering controller 94, a display controller 95, a sound controller 96, a light controller 97, a Heating Ventilation and Air-Conditioning (hereinafter, HVAC) controller 98, and a seat controller 99. The vehicle equipment devices are individually controlled by a corresponding one of the controllers 91 to 99.

The camera controller 91 controls the exposure of the in-vehicle camera and acquires images captured by the in-vehicle camera. The millimeter wave controller 92 controls the in-vehicle millimeter wave radar and acquires the detection results detected by the millimeter wave radar. The brake controller 93 controls a brake. The steering controller 94 controls steering. The display controller 95 controls displays (for example, meters, warning lights, etc.). The sound controller 96 controls the speaker to output sounds such as warning sounds and voices from the speaker. The light controller 97 controls various lights mounted on the vehicle. The HVAC controller 98 controls the in-vehicle air conditioner. The seat controller 99 controls an electric power seat of the vehicle.

In the present embodiment, the sixth ECU 91 includes the camera controller 91, the seventh ECU 92 includes the millimeter wave controller 92, and the eighth ECU 93 includes the brake controller 93. The ninth ECU 44 includes the steering controller 94, the tenth ECU 45 includes the display controller 95, and the eleventh ECU 46 includes the sound controller 96. The fifth ECU 30 includes the light controller 97, the twelfth ECU 47 includes the HVAC controller 98, and the thirteenth ECU 48 includes the seat controller 99.

The service providing unit 6 executes application software (hereinafter, "apps") 61 to 64 to provide services to users. Specifically, the service providing unit 6 provides, to the user, a service of indirectly transmitting instructions to the equipment device of the vehicle to operate the equipment device of the vehicle. The instruction includes commands such as operation requests, instructions such as arguments, function calls, and the like. Further, the instruction may include priority information indicating which instruction should be processed with priority.

The applications 61 to 64 are not programs for executing processes suited to a specific vehicle type, a specific grade, etc., but are general-purpose programs for executing processes suited to many vehicle models, many grades, etc. Therefore, the applications 61 to 64 cannot specify how the vehicle controls the vehicle equipment device. In other words, the applications 61 to 64 are software created without considering the characteristics of individual vehicles.

Therefore, by executing applications 61 to 64, the service providing unit 6 generates and outputs a first instruction that does not specify the control amount of a specific vehicle equipment device, in other words, a first instruction that does not specify which of the controllers 91 to 99 described later is to be used. That is, the service providing unit 6 generates the first instruction specifying desired abstract operation content. For example, the service providing unit 6 generates a first instruction specifying an operation content or function name to turn on the car finder, but does not specify which equipment device is to be controlled and how, such as specifying which of a plurality of lights to turn on. In another embodiment, the first instruction may specify a particular equipment device of the vehicle. For example, the first instruction may specify the vehicle equipment device and an operation to be performed, such as unlocking a driver door.

In addition, since the applications 61 to 64 are general-purpose programs, they can be developed by third parties and widely released. A user can install an application released by the third party into any one in the ECU group 100 via a wide area communication network or the like. That is, the user can add or change the applications 61 to 64. In another embodiment, the applications 61 to 64 may be applications developed by a vehicle manufacturer or an ECU manufacturer.

In the present embodiment, the first ECU 10, the second ECU, 15 and the center 35 are provided with the service providing unit 6. The ROM 11b of the first ECU 10 stores the applications 61 and 62. The ROM 11b of the second ECU 15 stores the application 63. The ROM 36b of the center 35 stores the application 64. In the present embodiment, the second ECU 15 or the center 35 corresponds to the service providing unit of the present disclosure.

The vehicle service unit 7 includes a vehicle Application Programming Interface (hereinafter, API) 71. The vehicle API 71 executes processes suited to a specific vehicle type, a specific grade, and the like. That is, the vehicle API 71 executes a process that absorbs differences in vehicle types, grades, and the like so that the service providing unit 6 does not need to be aware of differences in vehicle types, grades, and the like. The vehicle API 71 corresponds to an API that adapts instructions handled by the service providing unit 6 to instructions handled by the state management unit 8 and the equipment device management unit 9 described below. In the present embodiment, the first ECU 10 includes the service providing unit 6 and corresponds to the vehicle control device of the present disclosure.

In the present embodiment, the first ECU 10 includes the vehicle service unit 7.

The equipment device management unit 9 controls the equipment device of the vehicle. In detail, the state management unit 8 receives the first instruction via the vehicle API 71, generates the second instruction that embodies the first instruction, and transmits the second instruction to the equipment device management unit 9. For example, the state management unit 8 calculates the amount of operation of an actuator, which is one of the equipment device of the vehicle, and transmits the second instruction including the amount of operation to the equipment device management unit 9. The actuator is, for example, light, display, brake, camera, and the like.

Specifically, the state management unit 8 selects an optimal controller from among the controllers 91 to 99 included in the equipment device management unit 9 in order to implement the operation request (that is, the first instruction) from the service providing unit 6. Then, the state management unit 8 converts the first instruction into the second instruction in a format suitable for the selected controller, and distributes the second instruction to the selected controller in consideration of the order of transmission.

For example, when the first instruction is an instruction of "Turn vehicle left 200 m and accelerate at 0.3 G," the state management unit 8 outputs (i) a second instruction requesting the engine to output 1000 Nm, and (ii) a second instruction requesting the steering to output −0.1 rad.

Further, when the first instruction is an instruction of "Transition to parked state," the state management unit 8 outputs (i) a second instruction requesting shift into P, (ii) a second instruction requesting turn-off of the air conditioner, (iii) a second instruction requesting full close of the windows, and (iv) a second instruction requesting lock of the doors and transition to the parked state when requests (i) to (iii) have been completed and there are no occupants left.

The state management unit 8 includes a motion system equipment device controller 82, a Human Machine Interface (hereinafter, HMI) system state recognition unit 83, and a body system controller 84 in correspondence with the type of vehicle operation according to the type of the first instruction. The motion system equipment device controller 82 controls traveling type vehicle operations such as turning, traveling, and stopping. The motion system equipment device controller 82 converts the operation request of the vehicle into specific control amounts of the brake controller 93 and the steering controller 94, and outputs the converted control amounts. The state management unit 8 is classified according to vehicle operations that the service providing unit 6 is likely to request, rather than according to implementation means (for example, controllers 91 to 99) that are likely to depend on vehicle variations. For example, the state management unit 8 is provided correspondingly for each domain of the vehicle.

The HMI system state recognition unit 83 responds to vehicle operations related to the presentation of information to the user. The HMI system state recognition unit 83 determines, in response to a reception of the operation request such as warning, whether to perform notification using the display controller 95 and the sound controller 96, and outputs the corresponding control amount. The body system controller 84 determines, in response to reception of an instruction related to a vehicle environment, which one of the light controller 97, the HVAC controller 98, the seat controller 99 is to be operated. Then, the body system controller converts the instruction related to the vehicle environment into an appropriate instruction, and then outputs the converted instruction.

In the present embodiment, the first ECU 10 includes the motion system equipment device controller 82, the fourth ECU 25 includes the HMI system state recognition unit 83, and the fourth ECU 30 includes the body system controller 84.

Further, the state management unit 8 converts the sensor data acquired from the equipment device management unit 9 into a format suitable for the vehicle service unit 7, and transmits the converted data to the vehicle service unit 7. In detail, the state management unit 8 classifies the individual raw sensor data acquired by the equipment device management unit 9 from the vehicle sensors into data by sensing target that is easy for the service providing unit 6 to use. Further, the state management unit 8 integrates the classified data, converts it into more abstract data, and transmits it to the vehicle service unit 7.

For example, the state management unit 8 acquires, from the equipment device management unit 9, individual data such as vehicle speed 0 km/h, shift position P, and data indicating that the driver is not present in the vehicle. Based on the acquired data, the state management unit 8 transmits data indicating that the vehicle is in the parked state to the service providing unit 6 via the vehicle service unit 7.

The state management unit 8 includes a state recognition unit 81. The state recognition unit 81 acquires sensor data from the camera controller 91 and the millimeter wave controller 92, and converts the data into data on the positions of vehicles and pedestrians. The state management unit 8 transmits the converted data to the vehicle service unit 7. In the present embodiment, the third ECU 20 includes the state recognition unit 81.

2. Process (2-1. Basic Process)

Figure 4:
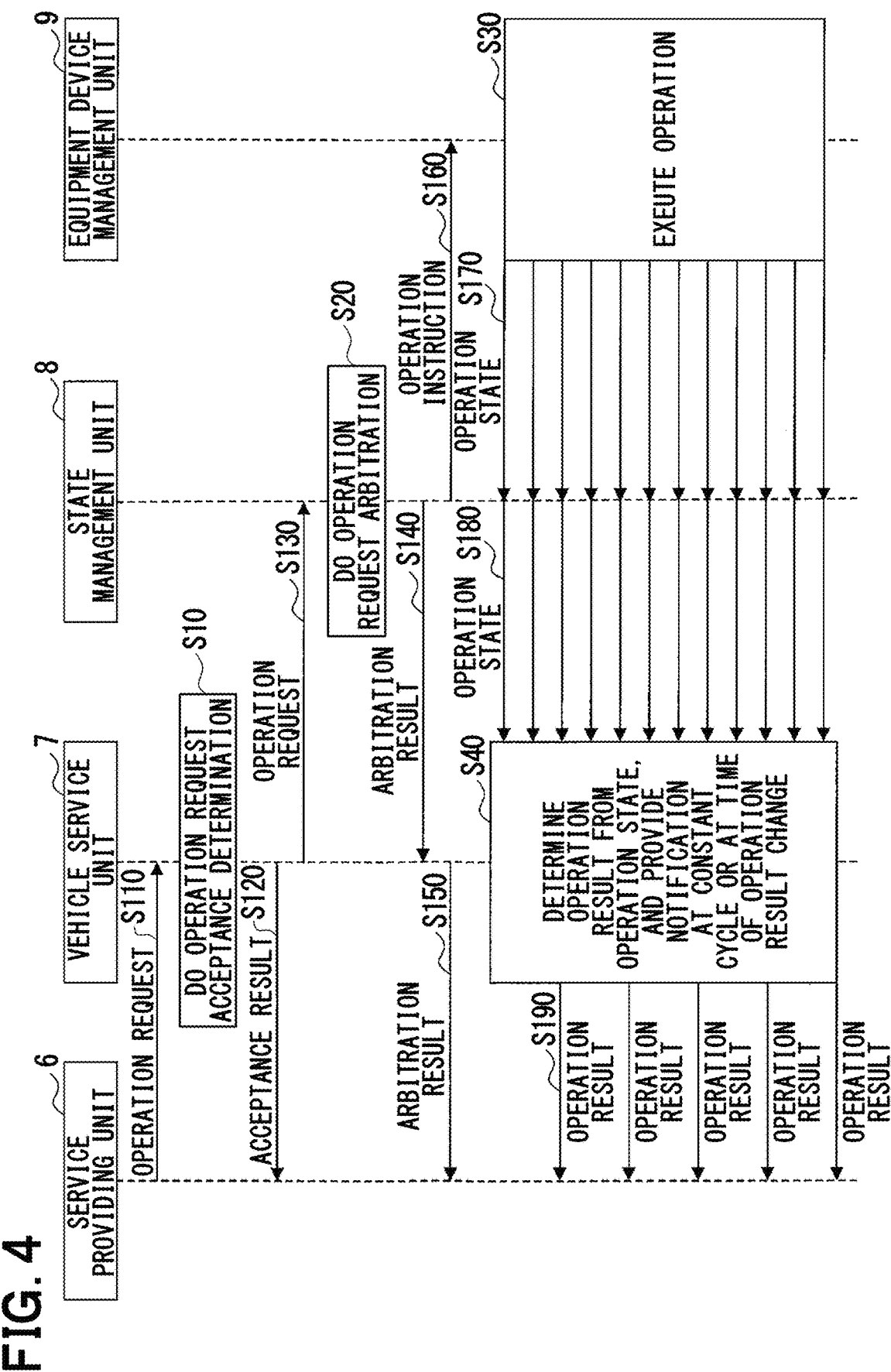
FIG. 4 is a sequence diagram showing a flow of basic processes executed in the vehicle control system according to the embodiment.

Next, the basic process executed by the vehicle control system 1 will be described with reference to a sequence diagram of FIG. 4.

In S110, the service providing unit 6 transmits an operation request to the vehicle service unit 7. Next, in S10, the vehicle service unit 7 executes an operation request reception determination to determine whether each of the controllers 91 to 99 is capable of receiving the first instruction.

Specifically, the vehicle service unit 7 determines whether the first instruction can be accepted based on at least one of the vehicle equipment device, the vehicle state, or the syntax of the instruction included in the first instruction. Note that the vehicle equipment device and vehicle state indicate the equipment device and state of the vehicle in which the vehicle control system 1 is installed.

The vehicle service unit 7 determines whether to accept the operation request from the service providing unit 6 based on, for example, the following six items.

(1) Syntax: Whether an error exists in an API syntax of the program.

(2) Equipment device information: Whether the vehicle is equipped with the target equipment device required to operate.

(3) Operation possible level: Whether the target equipment device required to operate can currently accept the operation request.

(4) Authentication/Authorization: Whether the service providing unit 6 corresponding to request source is authenticated, and whether the service providing unit 6 has an access right to the vehicle service unit 7.

(5) Abnormality in vehicle service unit 7: Whether an abnormality (for example, a data or communication abnormality, an operation other than specified normal operation, and the like) has occurred in the vehicle service unit 7.

(6) Cache state: After the state management unit 8 determines that the first instruction can not be accepted, whether a period of time for enabling acceptance of the similar first instruction is elapsed.

Note that in item (3), the state of "equipment device can accept operation requests" indicates that the operation request is within a predetermined range or the number of possible requests within a certain period is within a predetermined range. The number of possible requests indicates the number of received requests within the predetermined period of time and the like. In item (3), the operation request that does not match the vehicle state is rejected. For example, during traveling at 100 km/h, a request to open the door is rejected.

In item (5), depending on the combination of vehicle API 71 and the unacceptable contents, whether to cache the unacceptable information for each request source or whether to cache the unacceptable information regardless of the request source is changed.

The determination items may be properly set for each vehicle API 71 in the vehicle service unit 7. That is, determination may be omitted for some of the above-described items. The equipment information of the vehicle equipment device, the authentication state of the service providing unit 6 and the presence or absence of access right, the current vehicle state related to the equipment, and abnormality information of the vehicle service unit may be stored in the ROM 11$b$ of the first ECU 10. The information that the vehicle service unit 7 refers to when determining whether to accept the request, such as the cache state information is also stored in the ROM 11$b$ of the first ECU 10.

Next, in S120, the vehicle service unit 7 transmits an acceptance result indicating whether the first instruction can be accepted, to the service providing unit 6. That is, the vehicle service unit 7 transmits the acceptance result to the service providing unit 6 before the equipment device management unit 9 receives an operation instruction in S160.

The reception result includes information corresponding to the specified items. For example, the specified items include the following items (1) and (2).

(1) Acceptance state: execution state of acceptance determination for a request (determination in progress, request acceptance, request rejection, timeout)

(2) Reasons for rejection (varies depending on equipment device)

The state of the determination in progress is equivalent to a state in which it is not yet determined whether the operation request can be accepted. The state of the request acceptance corresponds to a state in which it has been determined that the operation request can be accepted. The state of the request rejection corresponds to a state in which it is determined that the operation request cannot be accepted. The timeout corresponds to a state in which the vehicle service unit 7 does not receive a determination result of the acceptance of the operation request from the state management unit 8 within a predetermined time (a first time threshold described later) after receiving the operation request. That is, the timeout may start from the time when the vehicle service unit 7 receives the operation request.

Next, in S130, the vehicle service unit 7 transmits the operation request to the state management unit 8. The operation request in S130 is transmitted only when it is determined that the first instruction can be accepted.

Next, in S20, in response to the operation request received from the vehicle service unit 7, the state management unit 8 performs operation request arbitration. Specifically, the state management unit 8 determines whether the first instruction can be accepted with consideration of the first instruction and a competition between the first instruction and another instruction different from the first instruction. The state management unit 8 may determine whether the request can be accepted, in consideration of a competition between a request received by the API 71 and a request received by another API (for example, another vehicle API) that is different from the API (for example, the vehicle API 71) that has received the request.

That is, in the above-described operation request acceptance determination, the vehicle service unit 7 refers to the vehicle state and the like to determine whether the operation request can be accepted, regardless of other instructions. In response to this, the state management unit 8 determines whether the operation request can be accepted in the operation request arbitration into consideration of the conflict with other instructions, etc. When the state management unit 8 can accept the operation request, the state management unit 8 generates a second instruction that specifies the generalized first instruction as the operation instruction.

The state management unit 8 determines whether the operation request can be accepted based on, for example, the following five items.

(1) Request priority arbitration: Whether the first instruction has a higher priority than requests based on other applications or user operations.

(2) Cancellation request by request source: Whether the request source has requested cancellation of the request and the request of the request cancellation is being processed.

(3) Cancellation request by user: Whether a stop request by user has occurred.

(4) Request processing overload: Whether the number of a plurality of requests received by the control target is equal to or more than the possible processing number.

(5) Abnormality in state management unit 8 or equipment device management unit 9: Whether an abnormality (for example, data or communication abnormality, an operation other than specified normal operation) has occurred in the state management unit 8 or the equipment device management unit 9.

In item (1), the priority is specified by the application, and the operation based on the priority is determined by the receiving side. However, the receiver may ignore the priority specified by the application when performing the operation.

For example, when the state management unit 8 receives a request to turn on an air conditioner and a request to turn on a light and when the voltage decreases to a level lower than an electrically allowable threshold, the state management unit 8 determines that both requests cannot be accepted. When the state management unit 8 receives a request related to acceleration and a request related to steering and when the vehicle drive control amount that satisfies both requests may cause the vehicle to deviate from the traveling road or lane, the state management unit 8 determines that both requests cannot be accepted. The priority information for each request, information related to cancellation by request source, information related to cancellation by user, and thresholds that can be processed by the vehicle equipment device (for example, number of requests, control amount, processing load, etc.) are stored in the ROM 11b. Information that the state management unit 8 refers to when determining acceptance of request, such as abnormality information of the state management unit 8 or the equipment device management unit 9 is stored in the ROM 11b of the first ECU 10, the third ECU 20, the fourth ECU 25, and the fifth ECU 40.

Next, in S140, the state management unit 8 transmits the determination result in S20 (i.e., the arbitration result) to the service providing unit 6 before the second instruction is transmitted to the equipment device management unit 9.

In S150, the vehicle service unit 7 relays the arbitration result transmitted from the state management unit 8, and transmits the arbitration result to the service providing unit 6.

In S160, the state management unit 8 outputs the second instruction (that is, an operation instruction) based on the first instruction to the controllers 91 to 99 of the equipment device management unit 9.

The fifth to thirteenth ECUs 30, 41 to 48 each include the ROM 11b in which an operation control program for operating the equipment device of the vehicle is stored, and executes the operation control program in response to the second instruction. As a result, in S30, each of the controllers 91 to 99 executes operational control of the target equipment device.

In S170, each of the controllers 91 to 99 sequentially and repeatedly transmits the operation state of the target equipment device onto the communication line. For example, the operation state may be transmitted as CAN (registered trademark) data.

In S180, the state management unit 8 receives the operation state and relays the received operation state to the vehicle service unit 7.

In S40, the vehicle service unit 7 receives the operation state transmitted from each of the controllers 91 to 99, and recognizes the operation result based on the received operation state. The operation result is data indicating whether the target equipment device is operating normally. The operation result is recognized based on data indicating the operation state of each of the controllers 91 to 99 acquired through the communication line.

The operation result includes information corresponding to the specified items. For example, the specified items include the following items (1), (2), and (3).

(1) Execution state: Execution state of the operation for the request (execution in progress, interruption and end, completion, timeout)

(2) Reason for interruption: Reason for interruption stop or end (contents vary depending on equipment device)

(3) Operation progress: The progress of the operation in response to the request (contents vary depending on equipment device)

In S190, the vehicle service unit 7 receives a plurality of operation states for the similar data, and transmits the operation results to the service providing unit 6 at regular cycles and/or when a preset condition is met.

The preset condition may be a condition that is properly set in advance. For example, the preset condition is satisfied when the vehicle state is changed, when the above-described operation possible level is changed, or when the operation state changes from execution state to stop state, or from stop state to execution state.

In such a manner, the vehicle service unit 7 reduces the transmission frequency of the operation result to be lower than the reception frequency of the operation state. Thereby, it is possible to reduce the processing load on the service providing unit 6. The operation result include information corresponding to specified items. For example, the specified items include the following items (1), (2), and (3).

(1) Execution state: Execution state of the operation for the request (execution in progress, interruption and end, completion, timeout)

(2) Reason for interruption: Reason for interruption stop or end (contents vary depending on equipment device)

(3) Operation progress: The progress of the operation in response to the request (contents vary depending on equipment device)

(2-2. Open Close Process of Sliding Door)

Figure 5:
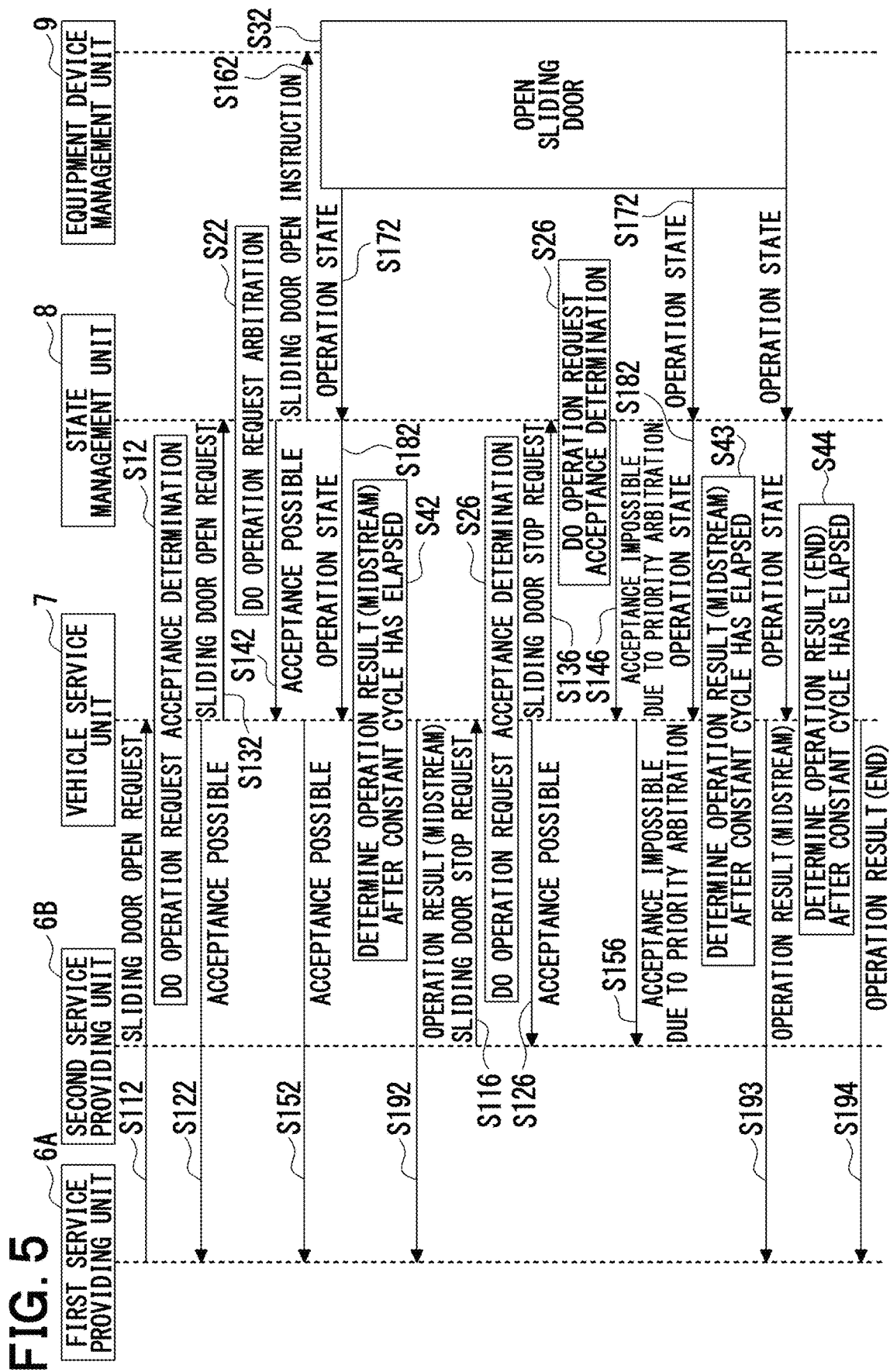
FIG. 5 is a sequence diagram showing a process flow when an operation request for opening and closing a sliding door is received in the vehicle control system according to the embodiment.

Next, with reference to a sequence diagram of FIG. 5, an open close process of a sliding door will be described as an example of a specific process executed by the vehicle control system 1. In this example, the service providing unit 6 includes a first service providing unit 6A and a second service providing unit 6B.

In S112, the first service providing unit 6A transmits, to the vehicle service unit 7, a sliding door open request for requesting that the sliding door be opened.

In S12, the vehicle service unit 7 executes the operation request acceptance determination in the similar manner to in S10. Here, the vehicle service unit 7 determines that the sliding door open request can be accepted, and in S122 transmits the acceptance result indicating that the first instruction can be accepted to the first service providing unit 6A. Next, in S132, the vehicle service unit 7 transmits the sliding door open request to the state management unit 8.

In response to receiving the sliding door open request from the vehicle service unit 7, the state management unit 8 performs operation request arbitration in S22. In S22, the state management unit 8 determines that the sliding door open request can be accepted. In S142, the state management unit 8 transmits a reception result indicating that the sliding door open request can be received to the first service providing unit 6A.

In S152, the vehicle service unit 7 relays the reception result to the first service providing unit 6A. In S162, the state management unit 8 outputs the second instruction (that is, instruction to open the sliding door) based on the first instruction, to the equipment device management unit 9.

In S172, the equipment device management unit 9 sequentially and repeatedly transmits the operation state of the sliding door toward the communication line. The operation state here includes, for example, the position of sliding door, in opening operation state, in closing operation state, in stop state.

In S182, the state management unit 8 receives the operation state and relays the received operation state to the vehicle service unit 7.

In S42, the vehicle service unit 7 receives the operation state transmitted from the equipment device management unit 9, and recognizes the operation result based on the operation state. In S192, the vehicle service unit 7 transmits, for example, an operation result indicating that the sliding door is normally opening, to the first service providing unit 6A.

Here, it is assumed that the vehicle service unit 7 receives another instruction while the sliding door is in the opening operation.

In S116, the second service providing unit 6B transmits the sliding door stop request to the vehicle service unit 7 to stop the sliding door. In S26, the vehicle service unit 7 performs an operation request acceptance determination. The vehicle service unit 7 performs the similar determination to in S10, and determines that the operation request can be accepted. Therefore, in S126, the vehicle service unit 7 transmits a reception result indicating that the first instruction can be received to the second service providing unit 6B. Next, in S136, the vehicle service unit 7 transmits the sliding door stop request to the state management unit 8.

In response to receiving the sliding door stop request from the vehicle service unit 7, the state management unit 8 performs operation request arbitration in S26. The state management unit 8 determines that the sliding door stop request cannot be accepted because the sliding door open request accepted at an early time has a higher priority.

In S146, the state management unit 8 transmits a reception result indicating that the acceptance of the sliding door stop request is not possible to the first service providing unit 6B. In S156, the vehicle service unit 7 relays the acceptance result indicating that the acceptance is not possible to the second service providing unit 6B. In this case, the state management unit 8 does not output the second instruction (that is, the sliding door stop request) to the equipment device management unit 9.

In S43 and S44, the vehicle service unit 7 repeatedly receives the operation state transmitted from the equipment device management unit 9, and recognizes the operation result based on the operation state each time receiving the operation state.

In S193, the vehicle service unit 7 transmits, for example, an operation result indicating that the sliding door is normally opening, to the first service providing unit 6A. When the sliding door opening operation is completed, in S194, the vehicle service unit 7 transmits, for example, an operation result indicating that the sliding door open operation has been normally completed to the first service providing unit 6A.

(2-3. Air Conditioner Activation Process)

Figure 6:
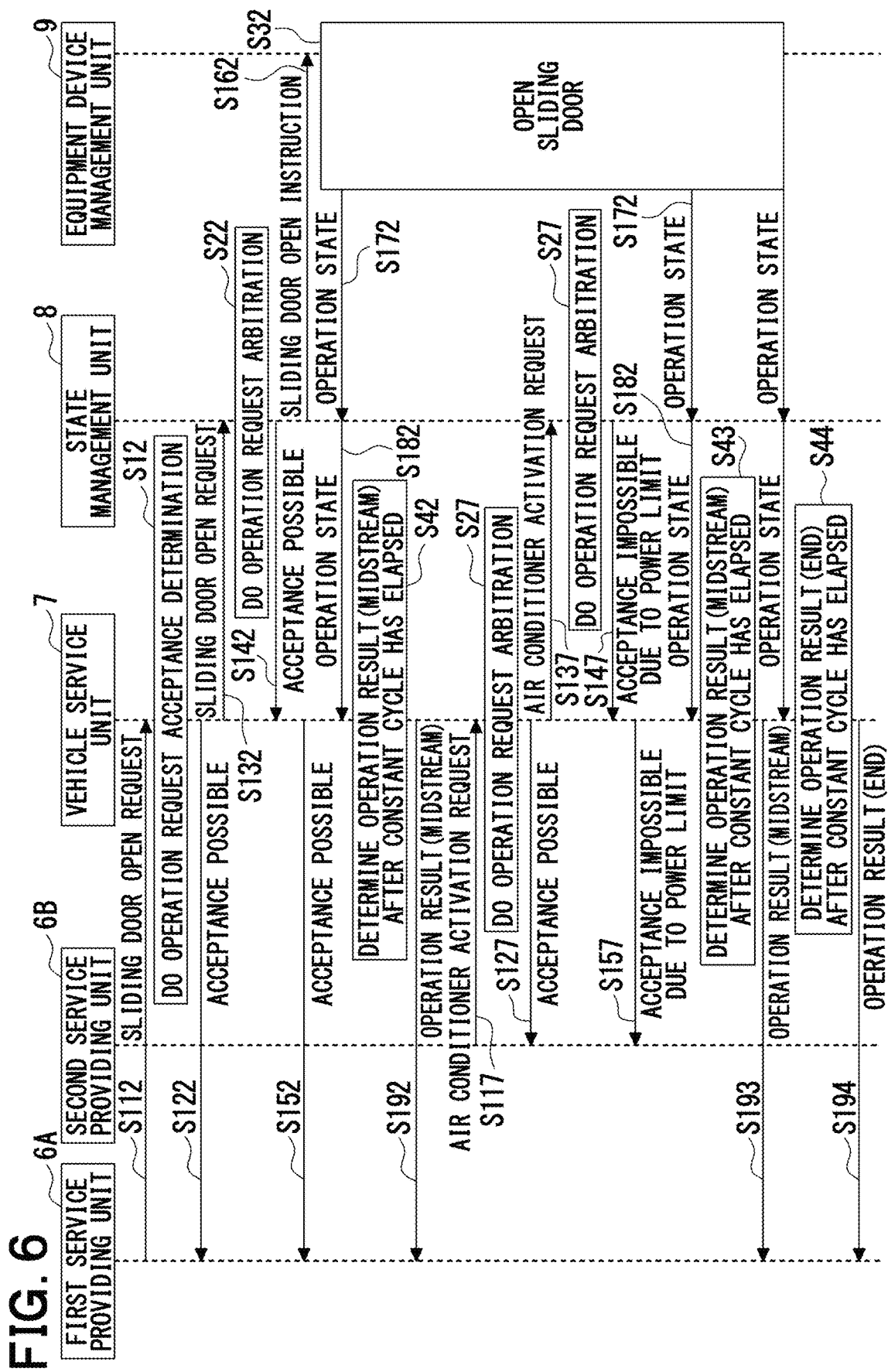
FIG. 6 is a sequence diagram showing a process flow in the case where a sliding door open request and an air conditioner start request conflict with each other in the vehicle control system according to the embodiment.

Next, with reference to the sequence diagram of FIG. 6, an air conditioner activation process will be described in the case where the vehicle service unit 7 receives an air conditioner activation request while the sliding door is in the open operation. In the present example, the operation in response to the sliding door request from the first service providing unit 6A is similar to the example shown in FIG. 5.

In S117, the second service providing unit 6B transmits the air conditioner activation request to the vehicle service unit 7. In S27, the vehicle service unit 7 executes the operation request acceptance determination in the similar manner to in S10. Here, the vehicle service unit 7 determines that the request can be accepted. Therefore, in S127, the vehicle service unit 7 transmits a reception result indicating that the first instruction can be received to the second service providing unit 6B. Next, in S137, the vehicle service unit 7 transmits the air conditioner activation request to the state management unit 8.

In response to receiving the air conditioner activation request from the vehicle service unit 7, the state management unit 8 performs operation request arbitration in S27. Here, the state management unit 8 determines that the air conditioner activation request cannot be accepted because a sum of a power required for the already accepted sliding door open request and a power required for the air conditioner activation request exceeds the allowable power threshold.

In S147, the state management unit 8 transmits, to the vehicle service unit 7, a reception result indicating that the acceptance of the air conditioner activation request is impossible. In S157, the vehicle service unit 7 relays the acceptance result indicating that the acceptance is not possible to the second service providing unit 6B. In this case, the state management unit 8 does not output the second instruction (that is, the air conditioner start request) to the equipment device management unit 9.

(2-4. Timeout Process)

Figure 7:
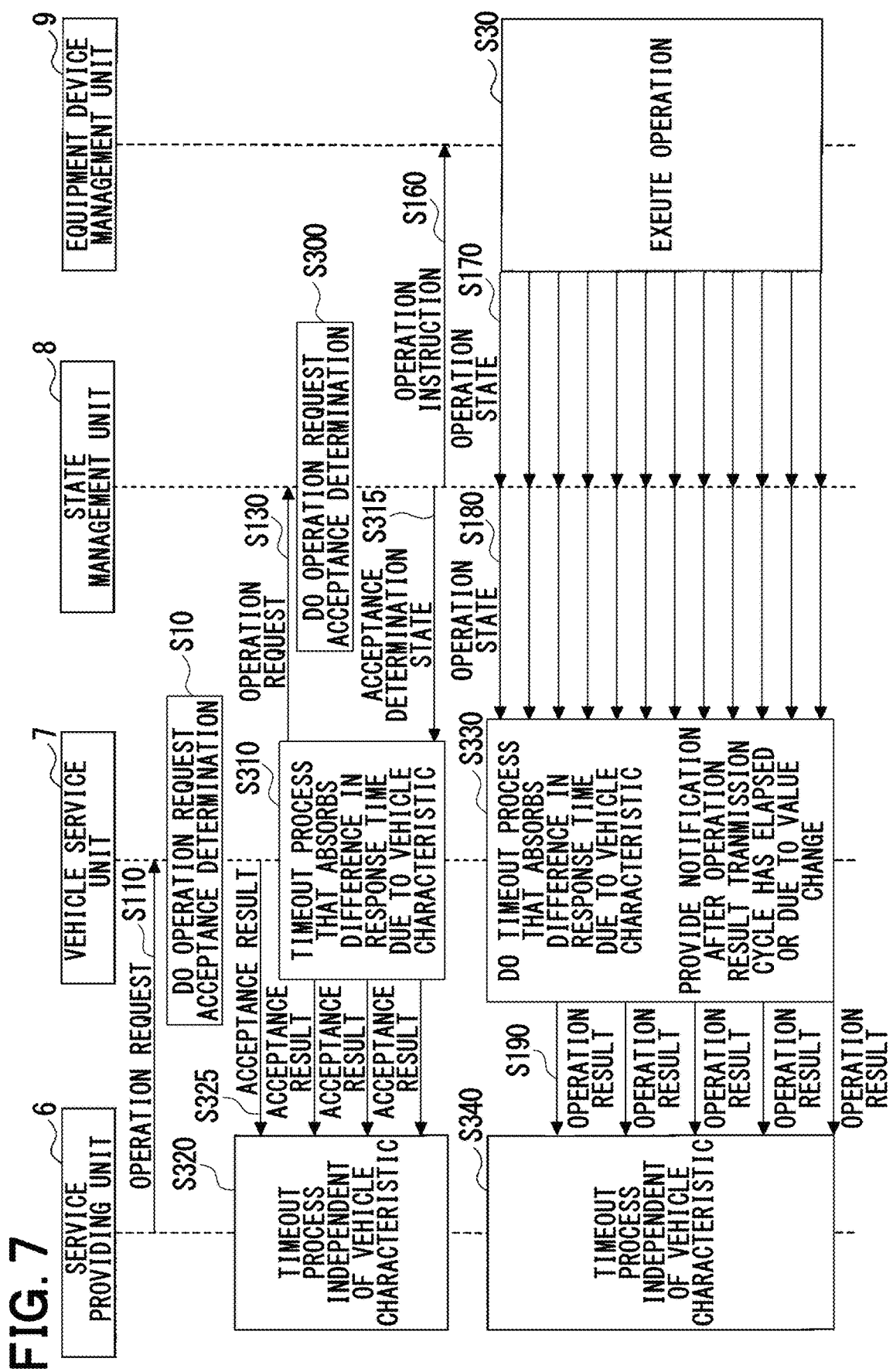
FIG. 7 is a sequence diagram showing a flow of basic processes executed in the vehicle control system according to the embodiment.

Next, with reference to a sequence diagram of FIG. 7, a description will be given of a timeout process in the case where the timeout process is executed in addition to the above-described basic process.

In S110, the service providing unit 6 transmits an operation request to the vehicle service unit 7. Next, in S10, the vehicle service unit 7 executes an operation request reception determination to determine whether each of the controllers 91 to 99 is capable of receiving the first instruction.

Next, in S325, the vehicle service unit 7 transmits an acceptance result indicating whether the first instruction can be accepted, to the service providing unit 6. The vehicle service unit 7 repeatedly transmits the reception result to the service providing unit 6 at a set first cycle.

In S130, the vehicle service unit 7 transmits an operation request to the state management unit 8 when the vehicle service unit 7 is ready to accept the first instruction. In S300, in response to receiving an operation request from the vehicle service unit 7, the state management unit 8 performs an operation request acceptance determination. The state management unit 8 determines whether the first instruction can be accepted with consideration of the first instruction and a competition between the first instruction and another instruction different from the first instruction.

In S315, the state management unit 8 transmits the reception determination status in S300 to the service providing unit 6 before the second instruction is transmitted to the equipment device management unit 9. The acceptance determination state, like the acceptance state, includes items of the acceptance determination execution state (determination in progress, request acceptance, request rejection, timeout) and the reason for rejection.

Further, in S310, the vehicle service unit 7 executes a first timeout process in response to receiving the operation request. The first timeout process is a timeout process that absorbs the difference in response time of the equipment device due to the vehicle characteristics. The timeout process includes a monitoring process of monitoring whether the timeout has occurred, and a process of notifying the user that the timeout has occurred.

The response time from receiving an operation instruction to operating the vehicle equipment device may differ depending on the vehicle model in which the equipment device is installed and an equipment device supplier. For example, the response time of an equipment device mounted on a luxury type vehicle model may be shorter than the response time of an equipment device mounted on a less expensive type vehicle. Further, in a case of vehicles having the same type, equipment devices from different suppliers may be mounted. The response times of the equipment device mounted on the vehicles having the same type are set to fall within a predetermined range, but differences may occur due to differences in suppliers.

Also, even in the case of the same equipment device, the response times may vary depending on the vehicle state. For example, the response time when the vehicle power state is battery power (+B) may be different from the response time when the vehicle power state is accessory power (ACC). Also, the response time when the vehicle power state is ignition power (IG) may be different from the response time when the vehicle power state is battery power. Further, the response time when the vehicle communication load is relatively high may be different (specifically, longer) than the response time when the vehicle communication load is relatively low.

In a case where the timeout process is executed using a fixed time threshold without taking into account the vehicle characteristics described above, when the response time of the target equipment device is relatively long, the timeout may be detected and the processing may be stopped.

On the other hand, when the third party is permitted to develop an application to be executed by the service providing unit 6, it is difficult for the third party to develop an application that takes into account the vehicle characteristics. It is desirable to provide an app development environment that is independent of vehicle characteristics.

Therefore, at a layer lower than the service providing unit 6, the vehicle service unit 7 executes a first timeout process taking into account the vehicle characteristics. In addition, in S320, the service providing unit 6 executes a second timeout process that is independent of the vehicle characteristics. In the present embodiment, the first ECU 10 including the vehicle service unit 7 executes the first timeout process. Further, the second ECU 15 having the service providing unit 6 executing the application 63, or the center 35 having the service providing unit 6 executing the application 64 executes the second timeout process.

In S310, the vehicle service unit 7 sets a first time threshold based on a data table according to the equipment device characteristics of the vehicle and/or the state of the vehicle, and executes the first timeout process using the first time threshold. Specifically, when the vehicle service unit 7 does not receive the acceptance determination state from the state management unit 8 within the first time threshold, the vehicle service unit 7 determines that the timeout has occurred and stops or suspends the process. When the vehicle service unit 7 stops or suspends the process, the reception result is no longer transmitted to the service providing unit 6. That is, after returning the reception result to the service providing unit 6 and before issuing an operation request, the vehicle service unit 7 starts counting the timeout and sets the first time threshold. The timing of the timeout and the setting of the first time threshold may be performed in any order. In another embodiment, the vehicle service unit 7 may set the first time threshold and start timing the timeout when receiving the operation request from the service providing unit 6.

In S320, the service providing unit 6 executes the second timeout process using a second time threshold. The second time threshold is preset to a value slightly greater than the first cycle. Specifically, when the service providing unit 6 does not receive a reception result from the vehicle service unit 7 within the second time threshold, the service providing unit 6 determines that the timeout has occurred and stops or suspends the process. For example, the service providing unit 6 sets a second time threshold (for example, 30 seconds) for performing a retry process, and requests the vehicle service unit 7 to retry when the timeout occurs. After issuing the operation request to the vehicle service unit 7, the service providing unit 6 acquires the second time threshold and starts timing the timeout.

In S160, when the state management unit 8 determines that the operation request is acceptable, the state management unit 8 outputs the second instruction (that is, an operation instruction) based on the first instruction to the controllers 91 to 99 of the equipment device management unit 9.

In S30, each of the controllers 91 to 99 receives an operation instruction and executes operation control of the target equipment device. In S170, each of the controllers 91 to 99 sequentially and repeatedly transmits the operation state of the target equipment device onto the communication line. In S180, the state management unit 8 receives the operation state and relays the received operation state to the vehicle service unit 7.

In S330, the vehicle service unit 7 receives the operation state transmitted from each of the controllers 91 to 99, and recognizes the operation result based on the received operation state. In S190, the vehicle service unit 7 receives a plurality of operation states for the similar data, and transmits the operation results to the service providing unit 6 at constant second cycles and/or when a preset condition is met. The second cycle may be different from or the same as the first cycle.

Further, in S330, in response to receiving the acceptance determination state indicating a state where the acceptance is possible, the vehicle service unit 7 sets a third time threshold based on the data table, and executes the first timeout process using the third time threshold. Specifically, the vehicle service unit 7 starts timing the timeout and sets a third time threshold. The timing of the timeout and the setting of the third time threshold may be performed in any order. When the vehicle service unit 7 does not receive the operation state from the state management unit 8 within the third time threshold, the vehicle service unit 7 determines that the timeout has occurred and stops or suspends the process. When the vehicle service unit 7 stops or suspends the process, the operation result is no longer transmitted to the service providing unit 6.

In S340, the service providing unit 6 executes the second timeout process using a fourth time threshold. The fourth time threshold is preset to a value slightly greater than the second cycle. Specifically, the service providing unit 6 acquires the fourth time threshold and starts timing the timeout. When the service providing unit 6 does not receive the operation result from the vehicle service unit 7 within the fourth time threshold, the service providing unit 6 determines that the timeout has occurred and stops or suspends the process. For example, the service providing unit 6 sets the fourth time threshold (e.g., one minute) to notify the user of the occurrence of a timeout, and when the timeout is determined to have occurred, it stops or interrupts the process and notifies the user of the occurrence of the timeout.

(2-4-1. Timeout Process by Service Providing Unit during Acceptance Determination)

Figure 8:
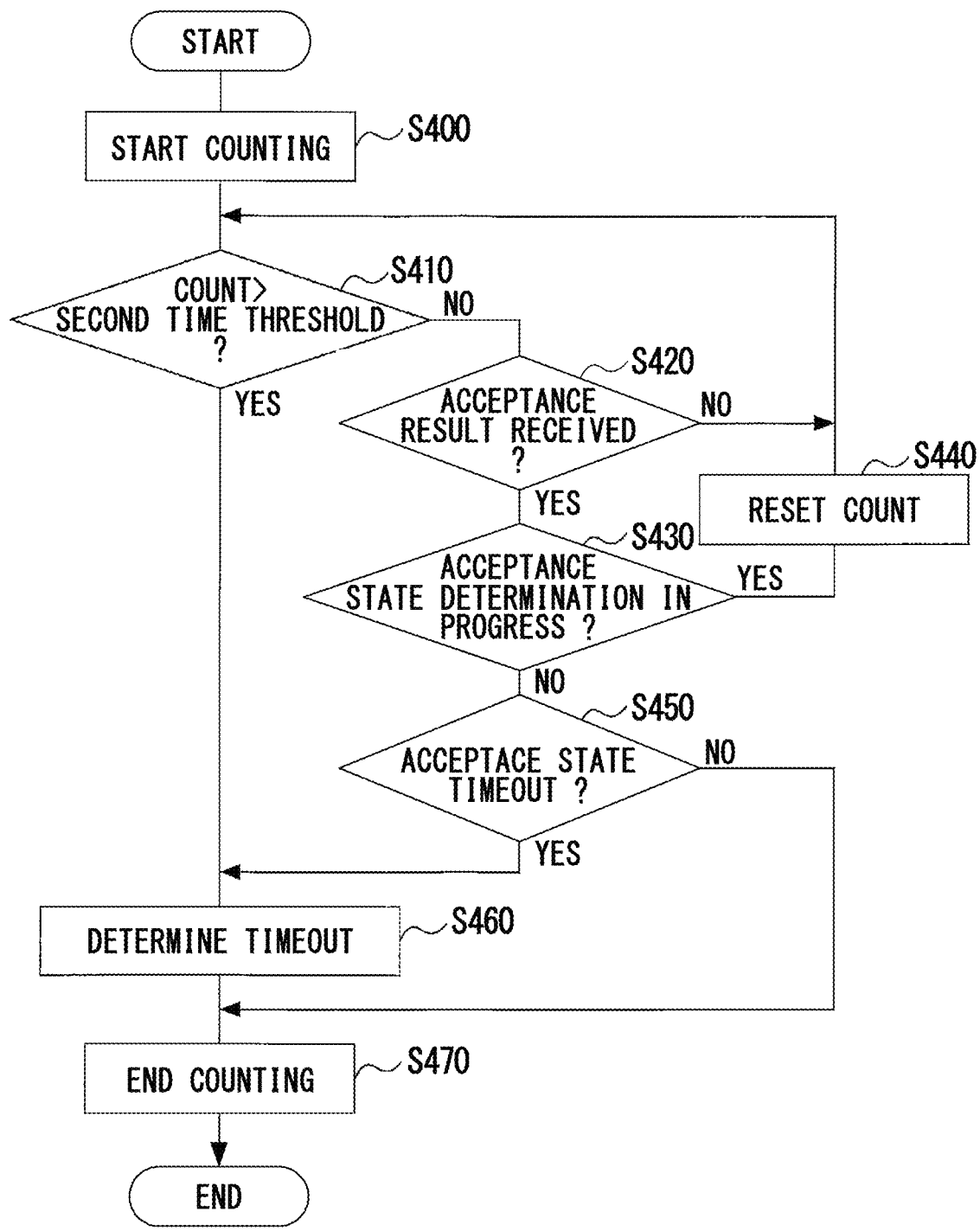
FIG. 8 is a flowchart showing a timeout process executed by a service providing unit during execution of an operation request acceptance determination in the embodiment.

Next, the second timeout process executed by the service providing unit 6 during the acceptance determination in S320 of FIG. 7 will be described in detail with reference to a flowchart of FIG. 8. The second timeout process here is executed at the stage of accepting an operation request before issuing an operation instruction to the equipment device management unit 9. The service providing unit 6 starts this process in response to outputting the operation request.

First, in S400, the service providing unit 6 starts counting.

Next, in S410, the service providing unit 6 determines whether a count value is greater than a preset second time threshold. When the service providing unit 6 determines that the count value is equal to or less than the second time threshold, the process proceeds to S420. When the service providing unit 6 determines that the count value is greater than the second time threshold, the process proceeds to S460.

In S420, the service providing unit 6 determines whether the acceptance result has been received. When the service providing unit 6 determines that the acceptance result has been received, the process proceeds to S430, and when it determines that the acceptance result has not been received, the process returns to S410.

In S430, the service providing unit 6 determines whether the acceptance state of the received acceptance result is a state of determination in progress. When the service providing unit 6 determines that the acceptance state is a state of determination in progress, it proceeds to a process in S440. When the service providing unit 6 determines that the acceptance state is not the state of determination in progress (i.e., request acceptance, request rejection, or timeout), it proceeds to a process S450.

In S440, the service providing unit 6 resets the count and returns to the process of S410.

In S450, the service providing unit 6 determines whether the acceptance state is the timeout. When the service providing unit 6 determines that the acceptance state is the timeout, it proceeds to a process in S460. When the service providing unit 6 determines that the acceptance state is not the timeout (i.e., request acceptance or request rejection), it proceeds to a process in S470.

In S460, the service providing unit 6 determines that the timeout has occurred and stops the process. That is, the service providing unit 6 determines that the timeout has occurred when its own count value becomes equal to or greater than the second threshold and when it receives the timeout result from the vehicle service unit 7.

In S470, the service providing unit 6 ends the counting and ends this process.

(2-4-2. Timeout Process by Vehicle Service Unit during Acceptance Determination)

Figure 9:
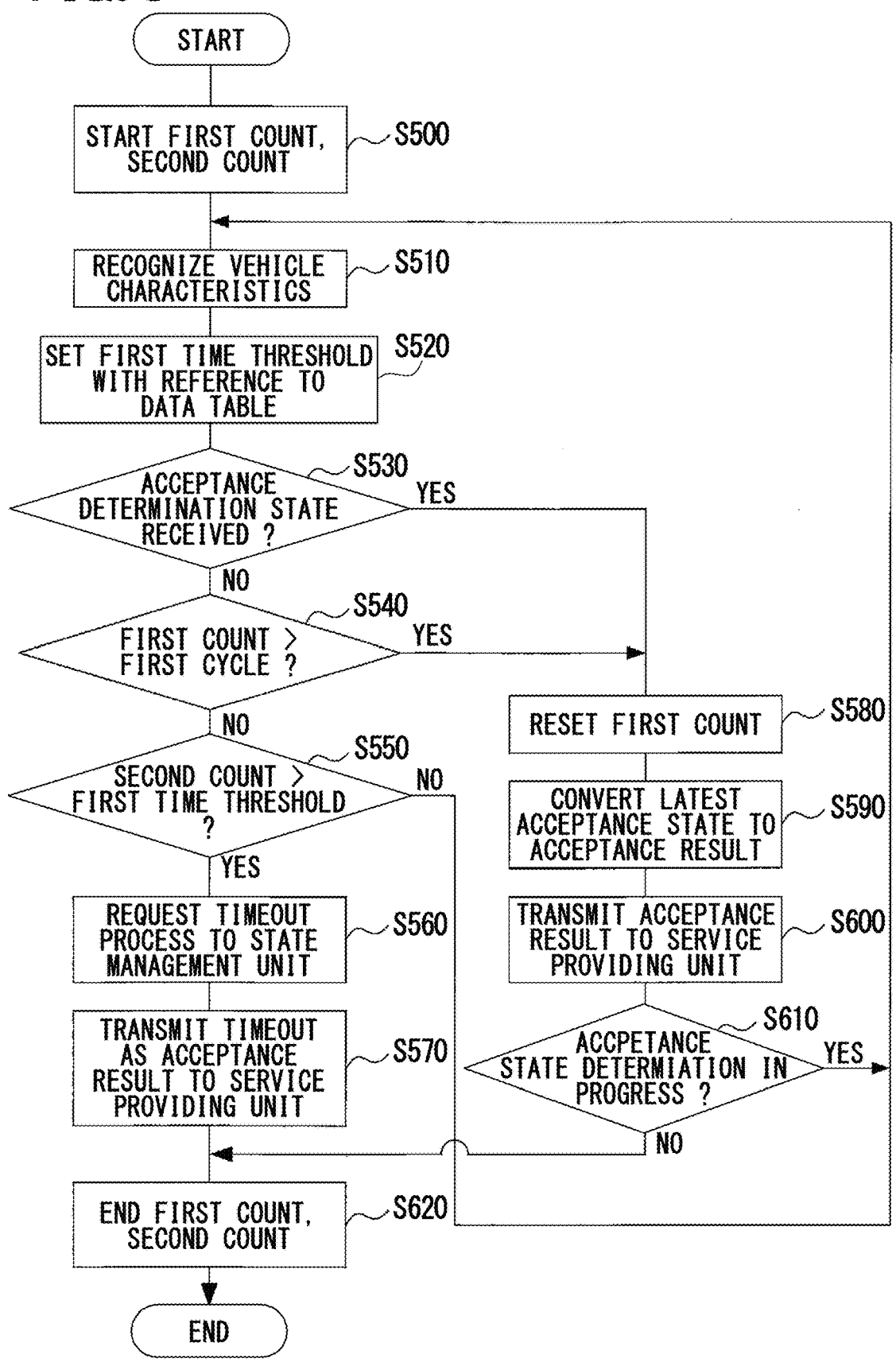
FIG. 9 is a flowchart showing a timeout process executed by a vehicle service unit during execution of an operation request acceptance determination in the embodiment.

Next, the first timeout process executed by the vehicle service unit 7 during the acceptance determination in S310 of FIG. 7 will be described in detail with reference to the flowchart of FIG. 9. The first timeout process here is executed at the stage of accepting an operation request before issuing an operation instruction to the equipment device management unit 9. The vehicle service unit 7 executes the operation after making an operation request to the state management unit 8 (S130).

First, in S500, the vehicle service unit 7 starts a first count and a second count. The value of the first count is a value for determining the timing of transmitting the acceptance result, and the value of the second count is a value for determining the timeout.

Next, in S510, the vehicle service unit 7 acquires the characteristics of the vehicle in which the vehicle service unit 7 (i.e., the first ECU 10) is mounted. The vehicle characteristics here include the characteristics of the target equipment device and the current vehicle state characteristics. The characteristics of the target equipment device are values determined according to the specifications of the equipment device of the subject vehicle, and are stored in advance in the ROM 11b. Specifically, the characteristics of the target equipment device include the OEM, the supplier, the in-vehicle communication standard used, the location of the service providing unit 6, and the like. The state characteristics change depending on the state of use of the vehicle, and the vehicle service unit 7 acquires the current state characteristics from the state management unit 8. Specifically, the state characteristics include the power supply state, the communication load, the communication means, and the request source of the operation request.

Next, in S520, the vehicle service unit 7 sets a first time threshold based on the current vehicle state characteristics acquired in S510 and the data table of the target equipment device. The data table is generated in advance for each equipment device and stored in the ROM 11b. Each data table is a table of setting values corresponding to the equipment device characteristics of the vehicle and the state characteristics of the vehicle. FIG. 12 shows an example in the data table. The data table for each equipment device includes a first table of first set values and a second table of second set values corresponding to the equipment device characteristics and state characteristics. In addition, the first ECU 10 updates the data table when the equipment device characteristics of the vehicle and/or the state characteristics of the vehicle change. The first ECU 10 obtains a new data table from a server or a diagnostic tool outside the vehicle, and stores the new data table in the ROM 11b. For example, in consideration of a case where the processing load increases due to the addition of functions through a program update and deterioration of the vehicle overall, the first ECU 10 updates the current data table to a data table in which new time setting values are determined.

Different suppliers may supply the same equipment for the same vehicle model, so vehicles of the same vehicle model may have different equipment device characteristics. However, generating a data table for each vehicle increases the time and cost, so a data table is generated for each vehicle type, for example. Therefore, as shown in FIG. 12, the ROM 11b stores a data table including the characteristics of the equipment device not mounted on the subject vehicle, and also stores the characteristics of the equipment device mounted on the subject vehicle (for example, made by Company Y as shown in FIG. 12). That is, the ROM 11b stores information indicating which of the equipment device characteristics included in the data table the subject vehicle belongs to. When the data table includes only the characteristics of the equipment device mounted on the subject vehicle and does not include the characteristics of the equipment device not mounted on the subject vehicle, the ROM 11b does not need to store the characteristics of the equipment device mounted on the subject vehicle separately from the data table.

During the acceptance determination, the vehicle service unit 7 extracts a first setting value corresponding to the equipment device characteristics and the state characteristics from the first table, and sets the extracted first setting value as the first time threshold.

Next, in S530, the vehicle service unit 7 determines whether the acceptance determination state has been received from the state management unit 8. When the vehicle service unit 7 determines that the acceptance determination state has not been received, the process proceeds to S540, and when it determines that the acceptance determination state has been received, the process proceeds to S580.

Next, in S540, the vehicle service unit 7 determines whether the value of the first count is greater than the first cycle (i.e., the acceptance result transmission cycle). When the vehicle service unit 7 determines that the value of the first count is less than or equal to the first cycle, it proceeds to a process in S550, and when it determines that the value of the first count is greater than the first cycle, it proceeds to a process in S580.

In S550, the vehicle service unit 7 determines whether the value of the second count is greater than the first time threshold. When the vehicle service unit 7 determines that the value of the second count is greater than the first time threshold, it proceeds to a process in S560, and when it determines that the value of the second count is less than or equal to the first time threshold, it returns to the process in S510. Thereby, when the state characteristics of the vehicle change during acceptance and determination, the first time threshold is changed based on the first table.

In S560, the vehicle service unit 7 requests the state management unit 8 to execute the timeout process. As the timeout process, the state management unit 8 cancels the operation instruction to the equipment device management unit 9 and/or stops notifying the vehicle service department.

Next, in S570, the vehicle service unit 7 transmits to the service providing unit 6 an acceptance result indicating that the acceptance state has timed out. Thereby, the service providing unit determines the timeout.

On the other hand, in S580, the vehicle service unit 7 resets the first count.

Next, in S590, the vehicle service unit 7 converts the latest acceptance state into the acceptance result. Specifically, the vehicle service unit 7 determines one acceptance result from the acceptance determination state received from the state management unit 8 and the acceptance determination result of the operation request determined by the vehicle service unit 7. Then, the vehicle service unit 7 converts the determined acceptance result into a format to be transmitted to the service providing unit 6.

Next, in S600, the vehicle service unit 7 transmits the acceptance result converted in S590 to the service providing unit 6.

Next, in S610, the vehicle service unit 7 determines whether the acceptance state of the acceptance result is being determined. When the vehicle service unit 7 determines that the acceptance state is being determined, the process returns to S510, and when it determines that the acceptance state is not being determined, the process proceeds to S620.

In S620, the vehicle service unit 7 ends the first count and the second count, and ends this process.

(2-2-3. Timeout Process by Service Providing Unit During Execution Monitoring Process)

Figure 10:
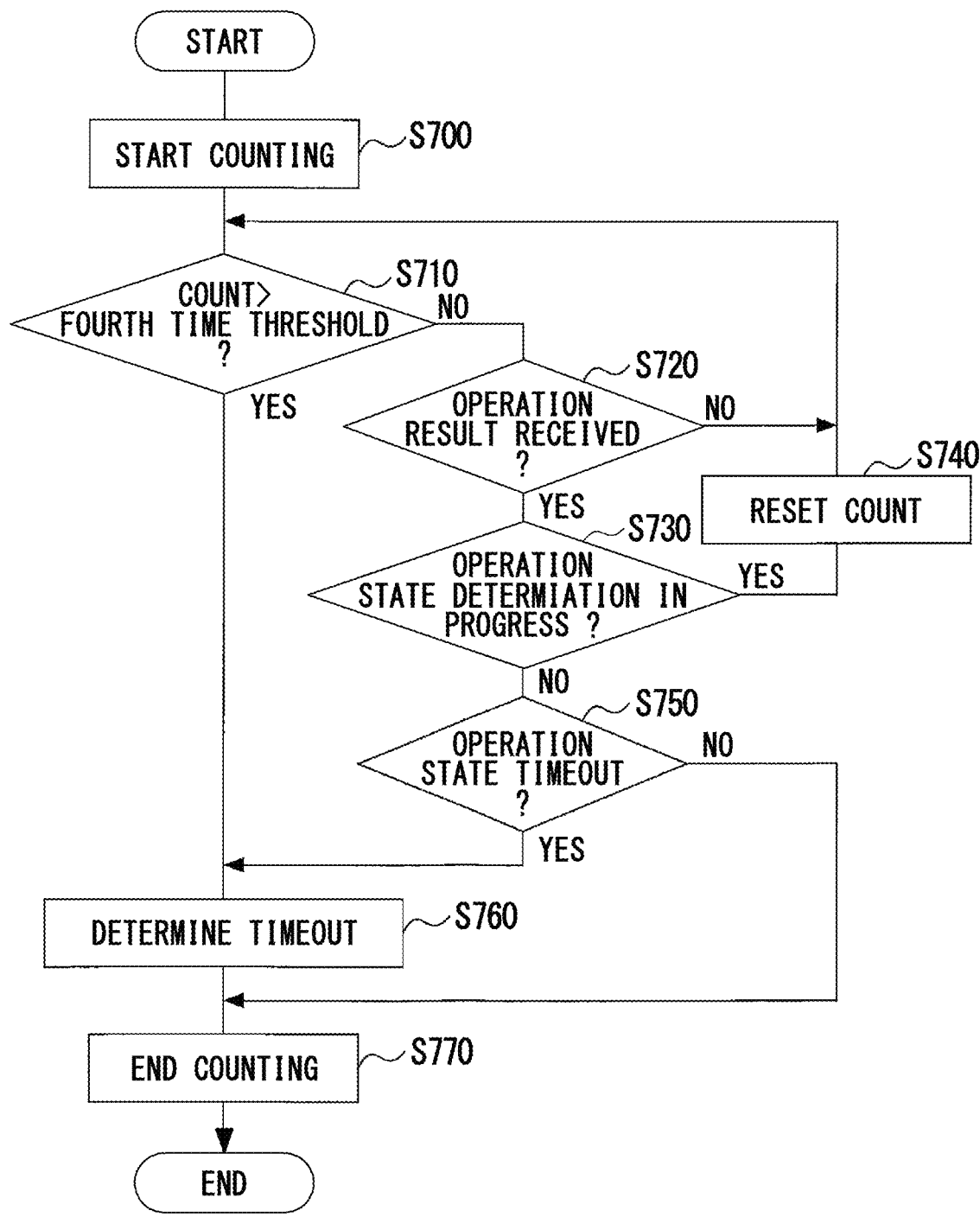
FIG. 10 is a flowchart showing a timeout process executed by the service providing unit during execution of an execution monitoring process in the embodiment.

Next, the second timeout process executed by the service providing unit 6 during the execution monitoring process in S340 of FIG. 7 will be described in detail with reference to a flowchart of FIG. 10. The second timeout process here is executed at the stage of executing the action request after the operation instruction is issued to the equipment device management unit 9.

First, in S700, the counting starts.

Next, in S710, the service providing unit 6 determines whether a count value is greater than a preset fourth time threshold. When it is determined that the count value is equal to or less than the fourth time threshold, the process proceeds to S720. When it is determined that the count value is greater than the fourth time threshold, the process proceeds to S760.

In S720, the service providing unit 6 determines whether the operation result has been received. When the service providing unit 6 determines that the operation result has been received, the process proceeds to S730, and when it determines that the operation result has not been received, the process returns to S710.

In S730, the service providing unit 6 determines whether the execution state of the received operation result is in progress. When the service providing unit 6 determines that the execution state is in progress, it proceeds to a process S740. When the service providing unit 6 determines that the execution state is not in progress (i.e., either suspension end, completion, or timeout), it proceeds to a process S750.

In S740, the service providing unit 6 resets the count and returns to the process of S710.

In S750, the service providing unit 6 determines whether the execution state is the timeout. When the service providing unit 6 determines that the execution state is the timeout, it proceeds to a process S760. When the service providing unit 6 determines that the execution state is not the timeout (i.e., suspension end or completion), it proceeds to a process S770.

In S760, the service providing unit 6 determines that the timeout has occurred and stops the process. That is, the service providing unit 6 determines that the timeout has occurred when its own count becomes equal to or greater than the fourth threshold and when it receives the timeout result from the vehicle service unit 7.

In S770, the service providing unit 6 ends the counting and ends this process.

(2-2-4. Timeout Process by Vehicle Service Unit During Execution Monitoring Process)

Figure 11:
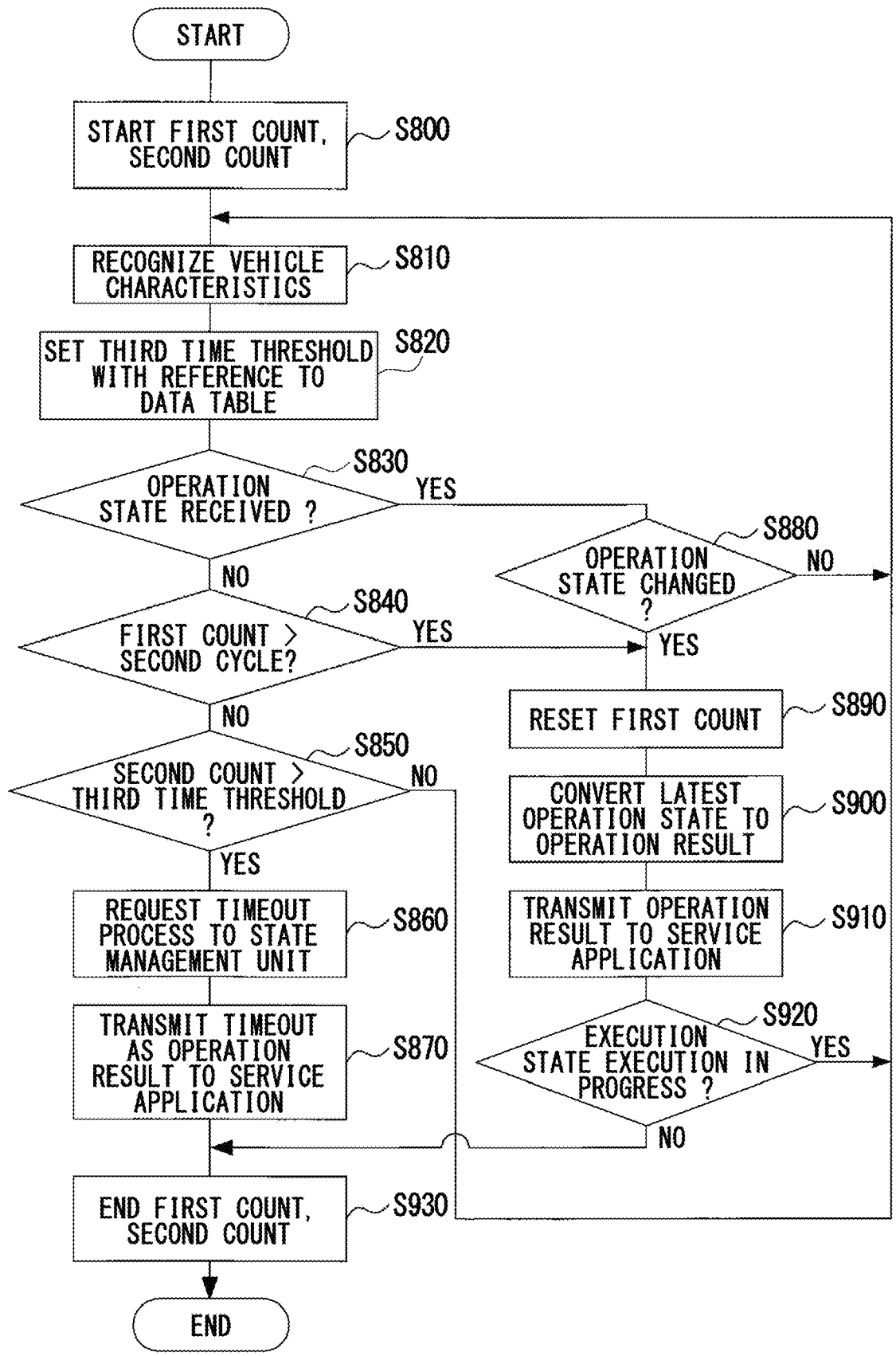
FIG. 11 is a flowchart showing a timeout process executed by the vehicle service unit during execution of an execution monitoring process in the embodiment.

Next, the first timeout process executed by the vehicle service unit 7 during the execution monitoring process in S330 in FIG. 7 will be described in detail with reference to a flowchart in FIG. 11. The first timeout process here is executed at the stage of executing the action request after the operation instruction is issued to the equipment device management unit 9.

First, in S800, the vehicle service unit 7 starts a first count and a second count. The value of the first count is a value for determining the timing of transmitting the operation result, and the value of the second count is a value for determining the timeout.

Next, in S810, the vehicle service unit 7 acquires the characteristics of the vehicle, similarly to S510.

Next, in S820, the vehicle service unit 7 extracts a second setting value according to the equipment device characteristics and state characteristics from the second table, similar to S520, and sets the third time threshold value based on the extracted second setting value.

Next, in S830, the vehicle service unit 7 determines whether the operation state has been received from the state management unit 8. When the vehicle service unit 7 determines that the operation state has not been received, the process proceeds to S840, and when it determines that the operation state has been received, the process proceeds to S890.

Next, in S840, the vehicle service unit 7 determines whether the value of the first count is greater than the second cycle (i.e., the operation result transmission cycle). When the vehicle service unit 7 determines that the value of the first count is less than or equal to the second cycle, it proceeds to a process S850, and when it determines that the value of the first count is greater than the second cycle, it proceeds to a process in S900.

In S850, the vehicle service unit 7 determines whether the value of the second count is greater than the third time threshold. When the vehicle service unit 7 determines that the value of the second count is greater than the third time threshold, it proceeds to a process in S860, and when it determines that the value of the second count is less than or equal to the third time threshold, it returns to the process in S810. Thereby, in a case where the vehicle state characteristics change during the period from when the operation request is transmitted to a time when the operation of the target equipment device is completed, the second time threshold is changed based on the second table.

In S860, the vehicle service unit 7 requests the state management unit 8 to execute the timeout process.

Next, in S870, the vehicle service unit 7 transmits, to the service providing unit 6, the operation result indicating that the execution state is the timeout. Thereby, the service providing unit determines the timeout.

On the other hand, in S880, the vehicle service unit 7 determines whether there is a change in the operation state. When the vehicle service unit 7 determines that the operation state has not been changed, the process proceeds to S890, and when it determines that the operation state has not been changed, the process proceeds to S900.

In S890, the vehicle service unit 7 resets the first count.

Next, in S900, the vehicle service unit 7 converts the latest operation state into the operation result.

Next, in S910, the vehicle service unit 7 transmits the operation result converted in S900 to the service providing unit 6.

Next, in S920, the vehicle service unit 7 determines whether the execution state of the operation result is in execution. When the vehicle service unit 7 determines that the operation state is in progress, the process returns to S810, and when it determines that the operation state is not in progress, the process proceeds to S930.

In S930, the vehicle service unit 7 ends the first count and the second count, and ends this process.

3. Effects (1) The vehicle service unit 7 sets the first time threshold and the third time threshold according to the characteristics of the target equipment device and the current vehicle state characteristics, and executes a first timeout process based on the set first time threshold and third time threshold. That is, the vehicle service unit 7 executes the timeout process in consideration of the difference in response time due to the characteristics of the target equipment device and the current state characteristics of the vehicle. When the vehicle service unit 7 stops the process according to the reception of the operation request, no response is transmitted from the vehicle service unit 7 to the service providing unit 6. Therefore, when the service providing unit 6 does not receive an acceptance result or operation result from the vehicle service unit 7 in the first or second cycle, it can determine the timeout and stop the process in response to the transmission of the operation request. Accordingly, in the vehicle service unit 7, it is possible to implement the timeout process that absorbs differences in response time due to the vehicle characteristics. Further, the service providing unit 6 can implement the timeout process that is independent of the vehicle characteristics. The service providing unit 6 can implement the timeout process without being aware of the difference in response time due to the characteristics of the vehicle.

(2) While determining whether the operation request can be accepted, the service providing unit 6 can implement the timeout process that is independent of vehicle characteristics.

(3) During the execution monitoring process, the service providing unit 6 can implement the timeout process that is independent of vehicle characteristics.

(4) The vehicle service unit 7 transmits the acceptance result or the operation result to the service providing unit 6 at the first or second cycle. Thereby, when the service providing unit 6 does not receive the acceptance result or operation result within the first or second cycle, it can determine the timeout and stop or suspend the process.

Further, the response is transmitted from the vehicle service unit 7 to the service providing unit 6 at the time when the operation state of the target equipment device changes, so that the service providing unit 6 can recognize the latest operation state.

(5) Since the items of reception results and operation results are specified, third parties can easily develop applications for providing services to vehicle users.

(6) The state of the vehicle may change between the reception of the operation request and the end of the operation of the target equipment device. The vehicle service unit 7 can execute the first timeout process based on the first time threshold or the third time threshold according to the current vehicle state by changing the first time threshold or the third time threshold in response to the change in the vehicle state.

(7) When the equipment device characteristics for the vehicle and/or the vehicle state characteristics change, the data tables are updated. Thereby, the vehicle service unit 7 can always set the first time threshold and the third time threshold according to the characteristics of the target equipment device and the current state of the vehicle.

Other Embodiments

Although the embodiment of the present disclosure has been described above, the present disclosure is not limited to the embodiment described above, and various modifications can be made to implement the present disclosure.

Figure 13:
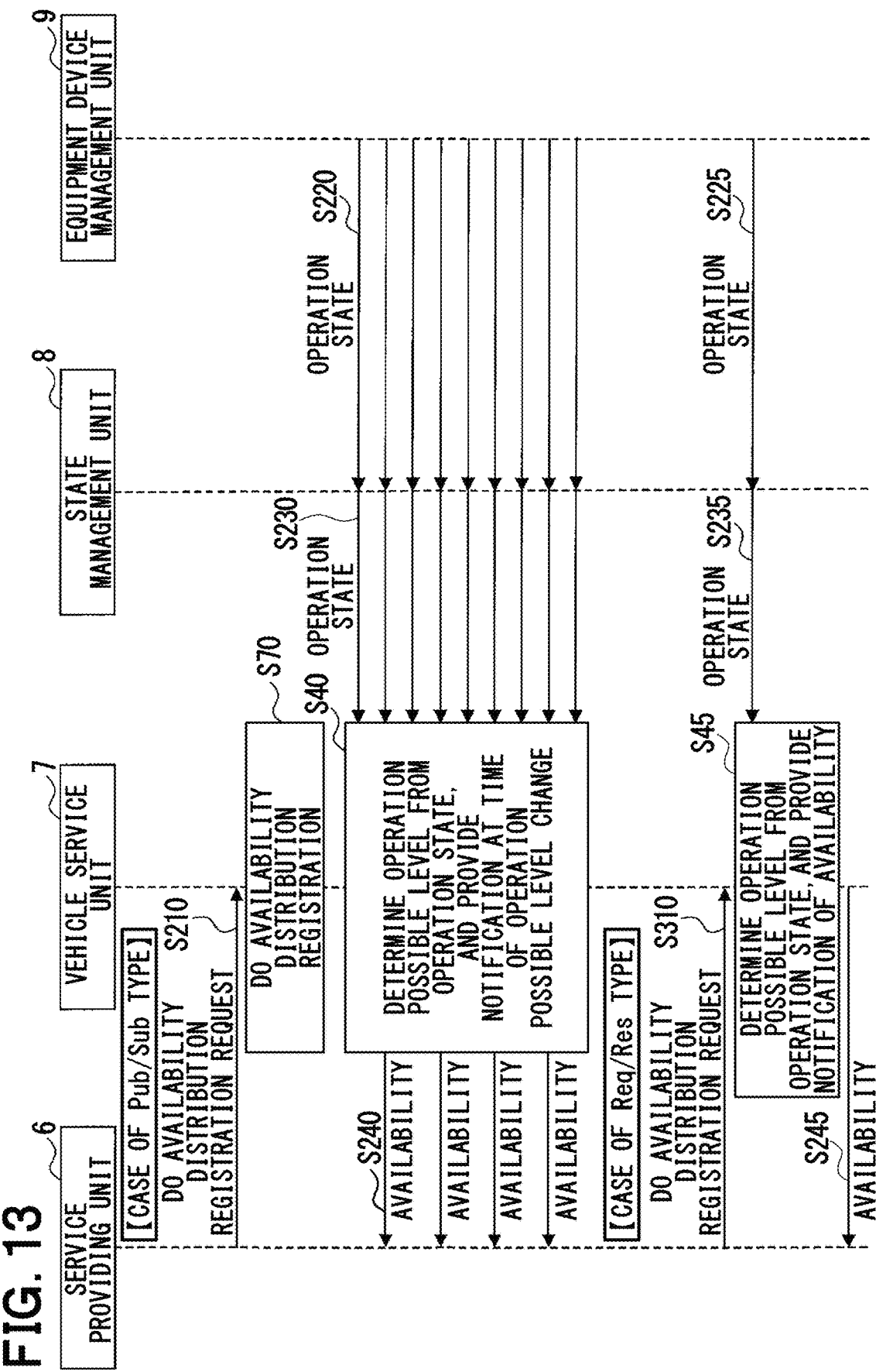
FIG. 13 is a sequence diagram showing a setting example for transmitting an operation result in a vehicle control system according to another embodiment.

(a) In the above embodiment, the vehicle service unit 7 is configured to transmit the operation result to the service providing unit 6 in response to a satisfaction of preset conditions in S40. The present disclosure is not limited to this configuration. For example, as shown in FIG. 13, the service providing unit 6 may set a transmission manner of the operation result by the vehicle service unit 7. In FIG. 13, the operation result in FIG. 4 is expressed as availability. Availability generally refers to a breakdown resistance of a system or the like. In the present disclosure, the availability indicates a concept that includes the determination result, such as a system failure, the above-described operation result, or the like.

The vehicle service unit 7 can employ either a Pub/Sub (Publish-Subscribe) type or a Req/Res (Request-Response) type. In a transmission method according to Pub/Sub type, once transmission parameters such as a transmission period of availability or the number of transmissions are registered, data is transmitted according to the set transmission parameters. In a transmission method according to the Req/Res type, data is transmitted in response to reception of a request.

In the case of Pub/Sub, the service providing unit 6 preliminarily sets transmission parameters before S40. For example, the service providing unit 6 transmits an availability distribution registration request to the vehicle service unit 7 in S210. Upon receiving the availability distribution registration request, the vehicle service unit 7 transmits an availability to the service providing unit 6 in S240 in accordance with the settings of the transmission parameters included in the availability distribution registration request. The vehicle service unit 7 receives a plurality of operation states, which are transmitted by the equipment device management unit 9 and the state management unit 8 in S220 and S230, and then generates the availability. At this time, the vehicle service unit 7 may determine the operation possible level (that is, whether the first instruction can be accepted) based on the operation state, and may properly change the setting of operation possible level. The vehicle service unit 7 may transmit the availability when the setting of operation possible level is changed.

In the case of Req/Res type, the service providing unit 6 transmits an availability distribution registration request to the vehicle service unit 7 in S310. Upon receiving the availability distribution registration request, the vehicle service unit 7 transmits the requested availability to the service providing unit 6 in S240. The vehicle service unit 7 generates availability upon receiving at least one of the operation states, which are transmitted by the equipment device management unit 9 and the state management unit 8 in S225 and S235. At this time, the vehicle service unit 7 may determine the operation possible level from the operation state, and transmit the availability including the operation possible level.

(b) In the above embodiment, the state management unit 8 is configured to provide the response for the arbitration result requested by the vehicle service unit 7. The present disclosure is not limited to this configuration. For example, as shown in FIG. 14, when the state management unit 8 is configured to be unable to provide a response for the arbitration result of S20 requested by the vehicle service unit 7, the vehicle service unit 7 may be configured to execute the function of state management unit 8 instead of the state management unit 8 in S11. In this case, the vehicle service unit 7 may perform part or all of the operation request arbitration (for example, process of S20) using part of the arbitration result transmitted from the state management unit 8, the operating state of the state management unit 8, and the operation state transmitted from the equipment device management unit 9. For example, the state management unit 8 may be configured to notify the vehicle service unit 7 of the acceptance result of the operation request transmitted from the vehicle service unit 7, the operation state of the state management unit 8 itself, and the operation state of the control target transmitted from the equipment device management unit 9. In this configuration, the above-described operation request arbitration (S20, S22) may be performed by the vehicle service unit 7.

(c) In the above embodiment, the first table and the second table for each equipment device are tables of first setting value and second setting value corresponding to the equipment device characteristics of the vehicle and the state characteristics of the vehicle. However, the present disclosure is not limited to this. The first table and the second table stored in the ROM 11b may be tables of first set value and second set value according to the vehicle characteristics including the equipment device characteristics of the vehicle or state characteristics of the vehicle. In other words, when the first table is a table of the first setting value according to the equipment device characteristics of the vehicle, the vehicle service unit 7 may set a first threshold time threshold based on the first setting value in the first table according to the equipment device characteristics of the target equipment device. Further, when the second table is a table of the second setting value according to the equipment device characteristics of the vehicle, the vehicle service unit 7 may set a third threshold time threshold based on the second setting value in the second table according to the equipment device characteristics of the target equipment device. Further, when the first table is a table of the first setting value according to the state characteristics of the vehicle, the vehicle service unit 7 may set a first threshold time threshold based on the first setting value in the first table according to the current vehicle state. Further, when the second table is a table of the second setting value according to the state characteristics of the vehicle, the vehicle service unit 7 may set a third threshold time threshold based on the second setting value in the second table according to the current vehicle state characteristics.

(d) In the above embodiment, the vehicle service unit 7 executed the first timeout process. However, the state management unit 8 or the equipment device management unit 9 may execute the first timeout process. That is, instead of the first ECU 10, any one of the third to thirteenth ECUs 20, 25, 30, and 41 to 48 may execute the first timeout process.

(e) In the above embodiment, the first ECU 10 includes the vehicle service unit 7, and the second ECU 15 or the sensor 35 includes the service providing unit 6. However, the first ECU 10 may include both the vehicle service unit 7 and the service providing unit 6. In other words, the vehicle control device and the service providing unit of the present disclosure may be configured as a single device.

(f) A plurality of functions of one component in the above embodiments may be implemented by a plurality of components, or a function of one component may be implemented by the plurality of components. A plurality of functions belonging to a plurality of configuration elements may be implemented by one configuration element, or one function implemented by a plurality of configuration elements may be implemented by one configuration element. A part of the configuration of the above embodiments may be omitted as appropriate. At least a part of the configuration in one embodiment may be added to or substituted for the configuration of another embodiment.

(g) In addition to the vehicle control device described above, the present disclosure can be implemented in various forms, such as a program for causing a computer to function as a vehicle control device, a non-transitory tangible storage medium such as a semiconductor memory in which this program is stored, and a vehicle control method.

What is claimed is:

1. A vehicle control device mounted to a vehicle, the device comprising:
   a storage that stores a data table of a setting value corresponding to an equipment device characteristic and a state characteristic of the vehicle for each of an equipment device of the vehicle;
   a request reception unit configured to receive an operation request for a target equipment device from a service providing unit configured to provide a service for operating the target equipment device that is an operation target of the equipment device;
   a threshold setting unit configured to set a time threshold based on a setting value according to the equipment device characteristic of the target equipment device and a current state characteristic of the vehicle of the setting value in the data table of the target equipment device when the request reception unit receives the operation request; and
   a timeout process unit configured to execute a timeout process during execution of a process in response to reception of the operation request by the request reception unit, based on the time threshold set by the threshold setting unit.

2. The vehicle control device according to claim 1, wherein
   the process in response to the reception of the operation request includes determination of whether the operation request is acceptable, and
   the timeout process unit is configured to execute the timeout process during execution of the determination.

3. The vehicle control device according to claim 1, wherein
the process in response to the reception of the operation request includes an execution monitoring process for monitoring execution of the target equipment device in response to the operation request, and
the timeout process unit is configured to execute the timeout process during execution of the execution monitoring process.

4. The vehicle control device according to claim 1, wherein
the timeout process unit is configured to repeatedly transmit a response to the operation request to the service providing unit at a specified cycle and at a time when a state of the vehicle changes.

5. The vehicle control device according to claim 4, wherein
the response includes information corresponding to a specified item, the information including information regarding a timeout.

6. The vehicle control device according to claim 1, wherein
the threshold setting unit is configured to change the time threshold based on the data table when a state characteristic of the vehicle changes during a period from when the request reception unit receives the operation request to when operation of the target equipment device ends.

7. The vehicle control device according to claim 1, further comprising
an update unit configured to update the data table when at least one of an equipment device characteristic of the vehicle or a state characteristic of the vehicle changes.

8. A vehicle control system comprising a vehicle control device mounted on a vehicle and a service providing unit configured to provide a service related to the vehicle, the vehicle control device comprising:
a storage that stores a data table of a setting value corresponding to a vehicle characteristic including an equipment device characteristic or a state characteristic of the vehicle for each of an equipment device of the vehicle;
a request reception unit configured to receive an operation request for a target equipment device that is an operation target of the equipment device from the service providing unit;
a threshold setting unit configured to set a first time threshold based on the setting value according to the vehicle characteristic of the setting value in the data table of the target equipment device when the request reception unit receives the operation request; and
a first timeout process unit configured to execute a first timeout process during execution of a process in response to reception of the operation request by the request reception unit, based on the first time threshold set by the threshold setting unit,
wherein
the service providing unit includes:
an execution unit configured to execute an application for operating the target equipment device;
a request transmission unit configured to transmit the operation request to the vehicle control device in response to execution of the application by the execution unit; and
a second timeout process unit configured to execute a second timeout process during execution of a process in response to transmission of the operation request by the request transmission unit, based on a second time threshold that dose not depend on the vehicle characteristic and is independent of the first time threshold.

9. A vehicle control method executed by a vehicle control device that is mounted on a vehicle and includes a storage that stores a data table of a setting value according to an equipment device characteristic and a state characteristic of the vehicle for each of an equipment device of the vehicle, the method comprising:
receiving an operation request for a target equipment device from a service providing unit configured to provide a service for operating the target equipment device that is an operation target of the equipment device;
setting a time threshold based on a setting value according to the equipment device characteristic of the target equipment device and a current state characteristic of the vehicle of the setting value in the data table of the target equipment device in response to reception of the operation request; and
executing a timeout process during execution of a process in response to the reception of the operation request based on the set time threshold.

10. A vehicle control method executed by a vehicle control system comprising: a vehicle control device mounted on a vehicle and storing a data table of a setting value according to an equipment device characteristic or a state characteristic of the vehicle for each of an equipment device of the vehicle; and a service providing unit configured to provide a service related to the vehicle, wherein
the vehicle control device is configured to:
receive an operation request for a target equipment device from the service providing unit, the target equipment device being an operation target of the equipment device;
set a first time threshold based on a setting value according to a characteristic of the target equipment device and a current state characteristic of the vehicle of the setting value in the data table of the target equipment device in response to reception of the operation request; and
execute a first timeout process during execution of a process in response to the reception of the operation request based on the set first time threshold, and
the service providing unit is configured to:
execute an application for operating the target equipment device;
transmit the operation request to the vehicle control device in response to execution of the application; and
execute a second timeout process during execution of a process in response to transmission of the operation request based on a fixed second time threshold independent of the first time threshold.

11. A non-transitory computer-readable storage medium storing a vehicle control program causing a processor of a vehicle control device mounted on a vehicle and including a storage that stores a data table of a setting value according to a state characteristic of the vehicle and an equipment device characteristic for each of an equipment device of the vehicle to:
receive an operation request for a target equipment device from a service providing unit configured to provide a service for operating the target equipment device that is an operation target of the equipment device;

set a time threshold based on a setting value according to the equipment device characteristic of the target equipment device and a current state characteristic of the vehicle of the setting value in the data table of the target equipment device in response to reception of the operation request; and execute a timeout process during execution of a process in response to the reception of the operation request based on the set time threshold.

12. A vehicle control device mounted to a vehicle, the device comprising:

a vehicle service unit configured to receive an operation request for a target equipment device from a service providing unit configured to provide a service for operating the target equipment device that is an operation target of the equipment device of the vehicle; and a state management unit configured to receive an operation request for the target equipment device from the vehicle service unit and instructs an equipment device management unit configured to control the equipment device of the vehicle to operate the target equipment device, wherein the vehicle service unit includes:

a storage that stores a data table of a setting value corresponding to an equipment device characteristic and a state characteristic of the vehicle for each of an equipment device of the vehicle;

a first request reception unit configured to receive an operation request for the target equipment device from the service providing unit;

a threshold setting unit configured to set a time threshold based on a setting value according to the equipment device characteristic of the target equipment device and a current state characteristic of the vehicle of the setting value in the data table of the target equipment device when the first request reception unit receives the operation request;

a timeout process unit configured to execute a timeout process during execution of a process in response to reception of the operation request by the first request reception unit, based on the time threshold set by the threshold setting unit; and a first notification unit configured to notify the service providing unit of an operation result according to the operation request for the target equipment device, and the state management unit includes:

a second request reception unit configured to receive the operation request for the target equipment device from the vehicle service unit;

an operation instruction unit configured to instruct the equipment device management unit to perform an operation on the target equipment device; and a second notification unit configured to notify the vehicle service unit of an operation state according to the operation request for the target equipment device.

13. A vehicle control method executed by a vehicle control device that is mounted on a vehicle and includes a storage that stores a data table of a setting value according to an equipment device characteristic and a state characteristic of the vehicle for each of an equipment device of the vehicle, the method comprising:

receiving an operation request for a target equipment device from a service providing unit configured to provide a service for operating the target equipment device that is an operation target of the equipment device;

setting a time threshold based on a setting value according to the equipment device characteristic of the target equipment device and a current state characteristic of the vehicle of the setting value in the data table of the target equipment device in response to reception of the operation request;

executing a timeout process during execution of a process in response to the reception of the operation request based on the set time threshold;

instructing an equipment device management unit configured to control an equipment device of the vehicle to operate for the target equipment device in response to the operation request;

receiving an operation state according to the operation request for the target equipment device from the equipment device management unit; and notifying the service providing unit of an operation result according to the operation request for the target equipment device.

14. A non-transitory computer-readable storage medium storing a vehicle control program causing a processor of a vehicle control device mounted on a vehicle and including a storage that stores a data table of a setting value according to a state characteristic of the vehicle and an equipment device characteristic for each of an equipment device of the vehicle to:

receive an operation request for a target equipment device from a service providing unit configured to provide a service for operating the target equipment device that is an operation target of the equipment device;

set a time threshold based on a setting value according to the equipment device characteristic of the target equipment device and a current state characteristic of the vehicle of the setting value in the data table of the target equipment device in response to reception of the operation request;

execute a timeout process during execution of a process in response to the reception of the operation request based on the set time threshold;

instruct an equipment device management unit configured to control an equipment device of the vehicle to operate for the target equipment device in response to the operation request;

receive an operation state according to the operation request for the target equipment device from the equipment device management unit; and notify the service providing unit of an operation result according to the operation request for the target equipment device.

* * * * *